(12) United States Patent
Frenne et al.

(10) Patent No.: US 10,178,661 B2
(45) Date of Patent: *Jan. 8, 2019

(54) QUASI CO-LOCATED ANTENNA PORTS FOR CHANNEL ESTIMATION

(71) Applicant: Telefonaktiebolaget L M Ericsson (publ), Stockholm (SE)

(72) Inventors: Mattias Frenne, Uppsala (SE); Erik Eriksson, Linköping (SE); Stefano Sorrentino, Solna (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 0 days.

This patent is subject to a terminal disclaimer.

(21) Appl. No.: 15/683,110

(22) Filed: Aug. 22, 2017

(65) Prior Publication Data

US 2017/0353949 A1 Dec. 7, 2017

Related U.S. Application Data

(63) Continuation of application No. 14/954,161, filed on Nov. 30, 2015, now Pat. No. 9,750,008, which is a
(Continued)

(51) Int. Cl.
*H04L 25/02* (2006.01)
*H04W 72/04* (2009.01)
(Continued)

(52) U.S. Cl.
CPC ......... *H04W 72/042* (2013.01); *H04L 5/0023* (2013.01); *H04L 5/0035* (2013.01);
(Continued)

(58) Field of Classification Search
CPC ... H04L 5/0035; H04L 5/0023; H04L 5/0091; H04L 25/0204; H04L 5/0048
See application file for complete search history.

(56) References Cited

U.S. PATENT DOCUMENTS 6,452,983 B1 9/2002 Asahara et al.
6,459,884 B1 10/2002 Amezawa
(Continued)

FOREIGN PATENT DOCUMENTS

RU 2396714 C1 8/2010
WO 2011008788 A1 1/2011
(Continued)

OTHER PUBLICATIONS

Alcatel-Lucent, "RP-120432: Status Report for RAN WG1 to TSG-RAN #56," 3rd Generation Partnership Project (3GPP), TSG RAN #56, Jun. 13-15, 2012, 34 pages, Ljubljana, Slovenia.
(Continued)

*Primary Examiner* — Jay P Patel
(74) *Attorney, Agent, or Firm* — Withrow & Terranova, PLLC

(57) ABSTRACT

Systems and methods are disclosed for estimating one or more channel properties of a downlink from a cellular communications network based on quasi co-located antenna ports with respect to the one or more channel properties. In one embodiment, a wireless device receives a downlink subframe including a downlink control channel from the cellular communications network. The wireless device estimates one or more large-scale channel properties for an antenna port of interest in the downlink control channel based on a subset of reference signals that correspond to antenna ports in the cellular communications network that are quasi co-located with the antenna port of interest with respect to the one or more large-scale channel properties. As a result of using the quasi co-located antenna ports, estimation of the one or more large-scale channel properties is substantially improved.

20 Claims, 17 Drawing Sheets

Related U.S. Application Data continuation of application No. 13/917,717, filed on Jun. 14, 2013, now Pat. No. 9,203,576.

(60) Provisional application No. 61/679,335, filed on Aug. 3, 2012.

(51) Int. Cl.
  *H04L 5/00* (2006.01)
  *H04W 84/04* (2009.01)

(52) U.S. Cl.
  CPC .......... *H04L 5/0048* (2013.01); *H04L 5/0091* (2013.01); *H04L 25/0204* (2013.01); *H04W 84/042* (2013.01)

(56) References Cited

U.S. PATENT DOCUMENTS

| | | | |
|---|---|---|---|
| 8,842,622 | B2 | 9/2014 | Zhang et al. |
| 9,203,576 | B2 | 12/2015 | Frenne et al. |
| 9,750,008 | B2 | 8/2017 | Frenne et al. |
| 2004/0101035 | A1 | 5/2004 | Boer et al. |
| 2010/0009675 | A1 | 1/2010 | Wijting et al. |
| 2011/0141987 | A1 | 6/2011 | Nam et al. |
| 2011/0176581 | A1 | 7/2011 | Thomas et al. |
| 2013/0188558 | A1 | 7/2013 | Nam et al. |
| 2013/0194931 | A1* | 8/2013 | Lee ................... H04L 5/0053 370/241 |
| 2013/0279437 | A1 | 10/2013 | Ng et al. |
| 2013/0301542 | A1* | 11/2013 | Krishnamurthy ..... H04W 52/50 370/329 |
| 2014/0036806 | A1 | 2/2014 | Chen et al. |
| 2015/0078285 | A1 | 3/2015 | Kim et al. |
| 2015/0173064 | A1 | 6/2015 | Kim et al. |
| 2015/0180625 | A1 | 6/2015 | Park et al. |
| 2015/0181568 | A1 | 6/2015 | Seo et al. |

FOREIGN PATENT DOCUMENTS

| | | | |
|---|---|---|---|
| WO | 2011147462 | A1 | 12/2011 |
| WO | 2014014576 | A1 | 1/2014 |

OTHER PUBLICATIONS

Author Unknown, "Technical Specification Group Radio Access Network; Evolved Universal Terrestrial Radio Access (E-UTRA); Physical Channels and Modulation (Release 11)," Technical Specification 36.211, Version 11.1.0, 3GPP Organizational Partners, Dec. 2012, 108 pages.
Author Unknown, "Technical Specification Group Radio Access Network; Evolved Universal Terrestrial Radio Access (E-UTRA); Physical layer procedures (Release 11)," Technical Specification 36.213, Version 11.1.0, 3GPP Organizational Partners, Dec. 2012, 160 pages.
Dahlman, Erik et al., "4G: LTE/LTE-Advanced for Mobile Broadband," (book), Chapter 10, Section 10.1.1.7, Elsevier Ltd., Oxford, United Kingdom, 2011, p. 148.
Ericsson, "R1- 122540: Draft LS response on reference scenarios for antenna ports co-location," 3rd Generation Partnership Project (3GPP), TSG-RAN1 Meeting #69, May 21-25, 2012, 2 pages, Prague, Czech Republic.
Huawei et al., "R1-122512: Discussion on antenna ports collocation," 3rd Generation Partnership Project (3GPP), TSG RAN WG1 Meeting #69, May 21-25, 2012, 7 pages, Prague, Czech Republic.
MCC Support, "R1-12xxxx: Draft Report of 3GPP TSG RAN WG1 #69 v0.2.0," 3rd Generation Partnership Project (3GPP), TSG RAN WG1 Meeting #70, Aug. 13-17, 2012, 123 pages, Qingdao, People's Republic of China.
Non-Final Office Action for U.S. Appl. No. 13/917,717, dated Apr. 8, 2015, 11 pages.
Notice of Allowance for U.S. Appl. No. 13/917,717, dated Jul. 27, 2015, 7 pages.
Non-Final Office Action for U.S. Appl. No. 14/954,161, dated Jan. 20, 2016, 10 pages.
Final Office Action for U.S. Appl. No. 14/954,161, dated Jul. 5, 2016, 16 pages.
Advisory Action for U.S. Appl. No. 14/954,161, dated Sep. 16, 2016, 3 pages.
Non-Final Office Action for U.S. Appl. No. 14/954,161, dated Oct. 26, 2016, 11 pages.
Final Office Action for U.S. Appl. No. 14/954,161, dated Mar. 24, 2017, 7 pages.
Notice of Allowance for U.S. Appl. No. 14/954,161, dated Apr. 27, 2017, 7 pages.
Translation of Reasons for Rejection for Japanese Patent Application No. 2015-524899, dated Mar. 1, 2016, 3 pages.
Notice of Preliminary Rejection for Korean Patent Application No. 2015-7005630, dated Apr. 12, 2016, 6 pages.
Decision on Grant for Russian Patent Application No. 2015107443/07, dated Jun. 1, 2016, 22 pages.
Translation of the Written Opinion for Singaporean Patent Application No. 11201501596X, dated Oct. 21, 2015, 9 pages.
International Search Report and Written Opinion for PCT/IB2013/056357, dated Dec. 6, 2013, 11 pages.
International Preliminary Report on Patentability and Written Opinion for International Application No. PCT/IB2014/065937, dated Feb. 3, 2015, 7 pages.

* cited by examiner

QUASI CO-LOCATED ANTENNA PORTS FOR CHANNEL ESTIMATION

RELATED APPLICATIONS

This application is a continuation of patent application Ser. No. 14/954,161, filed Nov. 30, 2015, now U.S. Pat. No. 9,750,008, which is a continuation of patent application Ser. No. 13/917,717, filed Jun. 14, 2013, now U.S. Pat. No. 9,203,576, which claims the benefit of provisional patent application Ser. No. 61/679,335, filed Aug. 3, 2012, the disclosures of which are hereby incorporated herein by reference in their entireties.

FIELD OF THE DISCLOSURE

The present disclosure relates to quasi co-located antenna ports in a cellular communications network that can be utilized for estimation of large-scale, or long-term, channel properties.

BACKGROUND

Third Generation Partnership Project (3GPP) Long Term Evolution (LTE) uses Orthogonal Frequency Division Multiplexing (OFDM) in the downlink and Discrete Fourier Transform (DFT) spread OFDM in the uplink. The basic LTE physical resource thus can be seen as a time-frequency grid as illustrated in FIG. 1, where each Resource Element (RE) corresponds to one subcarrier during one OFDM symbol interval on a particular antenna port. An antenna port is defined such that a channel over which a symbol on the antenna port is conveyed can be inferred from a channel over which another symbol on the same antenna port is conveyed. There is one resource grid per antenna port. Notably, as discussed in Erik Dahlman et al., 4G LTE/LTE-Advanced for Mobile Broadband, § 10.1.1.7 (2011), an antenna port does not necessarily correspond to a specific physical antenna but is instead a more general concept introduced, for example, to allow for beam-forming using multiple physical antennas. At least for the downlink, an antenna port corresponds to the transmission of a reference signal. Any data transmitted from the antenna port can then rely on that reference signal for channel estimation for coherent demodulation. Thus, if the same reference signal is transmitted from multiple physical antennas, these physical antennas correspond to a single antenna port. Similarly, if two different reference signals are transmitted from the same set of physical antennas, this corresponds to two separate antenna ports.

In the time domain, LTE downlink transmissions are organized into radio frames of 10 milliseconds (ms), where each radio frame consists of ten equally-sized subframes of 1 ms as illustrated in FIG. 2. A subframe is divided into two slots, each of 0.5 ms time duration. Resource allocation in LTE is described in terms of Resource Blocks (RBs), or Physical RBs (PRBs), where a resource block corresponds to one slot in the time domain and 12 contiguous 15 kilohertz (kHz) subcarriers in the frequency domain. Two consecutive resource blocks in the time domain represent a resource block pair and correspond to the time interval upon which scheduling operates.

Transmissions in LTE are dynamically scheduled in each subframe where a base station transmits downlink assignments/uplink grants to certain User Elements, or User Equipments, (UEs) via a Physical Downlink Control Channel (PDCCH) and, starting in LTE Release 11 (Rel-11), an enhanced PDCCH (ePDCCH). PDCCHs are transmitted in the first OFDM symbol(s) in each subframe and span (more or less) the whole system bandwidth. A UE that has decoded a downlink assignment, carried by a PDCCH, knows which resource elements in the subframe that contain data aimed for the UE. Similarly, upon receiving an uplink grant, the UE knows which time/frequency resources it should transmit upon. In the LTE downlink, data is carried by a Physical Downlink Shared Channel (PDSCH). In the uplink, the corresponding link is referred to as a Physical Uplink Shared Channel (PUSCH).

Definition of the ePDCCH is ongoing in 3GPP. It is likely that such control signaling will have similar functionalities as PDCCH. However, a fundamental difference for ePDCCH is that ePDCCH will require UE specific reference signals (i.e., Demodulation Reference Signals (DMRS)) instead of cell specific reference signals (i.e., Common Reference Signals (CRS) for its demodulation. One advantage is that UE specific spatial processing may be exploited for ePDCCH.

Demodulation of data sent via the PDSCH requires estimation of large-scale channel properties of the radio channel. This channel estimation is performed using transmitted reference symbols, where reference symbols are symbols of a Reference Signal (RS) and are known to the receiver. In LTE, CRS reference symbols are transmitted in all downlink subframes. In addition to assisting downlink channel estimation, the CRS reference symbols are also used for mobility measurements performed by the UEs. LTE also supports UE specific RS reference symbols aimed only for assisting channel estimation for demodulation purposes. FIG. 3 illustrates one example of mapping of physical control/data channels and signals onto resource elements within a RB pair forming a downlink subframe. In this example, PDCCHs occupy the first out of three possible OFDM symbols. So, in this particular case, the mapping of data could start at the second OFDM symbol. Since the CRS is common to all UEs in the cell, the transmission of the CRS cannot be easily adapted to suit the needs of a particular UE. This is in contrast to UE specific RSs where each UE has a UE specific RS of its own placed in the data region of FIG. 3 as part of the PDSCH.

The length of the control region, which can vary on a subframe basis, is conveyed in the Physical Control Format Indicator Channel (PCFICH). The PCFICH is transmitted within the control region at locations known by the UEs. After a UE has decoded the PCFICH, the UE knows the size of the control region and in which OFDM symbol the data transmission begins. A Physical Hybrid-Automatic Repeat Request (HARQ) indicator, which carries ACK/NACK responses to a UE to inform the UE of whether a corresponding uplink data transmission in a previous subframe was successfully decoded by the base station, is also transmitted in the control region.

In LTE Release 10 (Rel-10), all control messages to UEs are demodulated using the CRSs. Therefore, the control messages have cell wide coverage to reach all UEs in the cell. An exception is the Primary Synchronization Signal (PSS) and the Secondary Synchronization Signal (SSS), which are stand-alone and do not need reception of a CRS before demodulation. The first one to four OFDM symbols in a subframe, depending on the configuration, are reserved for such control information. Control messages can be categorized into control messages that need to be sent only to one UE in the cell (i.e., UE-specific control messages) and control messages that need to be sent to all UEs in the cell or some subset of the UEs in the cell numbering more than one (i.e., common control messages).

As illustrated in FIG. 4, control messages of the PDCCH type are demodulated using CRSs and transmitted in multiples of units called Control Channel Elements (CCEs), where each CCE contains 36 REs. A PDCCH may have an Aggregation Level (AL) of 1, 2, 4, or 8 CCEs to allow for link adaptation of the control message. Furthermore, each CCE is mapped to 9 Resource Element Groups (REGs) consisting of 4 REs each. These REGs are distributed over the whole system bandwidth to provide frequency diversity for a CCE. Hence, a PDCCH, which consists of up to 8 CCEs, spans the entire system bandwidth in the first one to four OFDM symbols, depending on the configuration.

In LTE Rel-11, it has been agreed to introduce UE-specific transmission of control information in the form of enhanced control channels. More specifically, it has been agreed to allow transmission of generic control messages to a UE using transmissions based on UE-specific RSs placed in the data region. This is commonly known as an ePDCCH, an enhanced Physical HARQ Indicator Channel (ePHICH), etc. FIG. 5 illustrates a downlink subframe showing 10 RB pairs and configuration of three ePDCCH regions of size 1 RB pair each. The remaining RB pairs can be used for PDSCH transmissions. For ePDCCH in LTE Rel-11, it has been agreed to use antenna port p∈{107,108,109,110} for demodulation as illustrated in FIG. 6 for normal subframes and normal cyclic prefix. More specifically, FIG. 6 illustrates an example of RE locations for UE-specific reference symbols (i.e., DMRS reference symbols) used for ePDCCH in LTE for one PRB pair. Note that, starting in LTE Rel. 11, more than one UE can, in some cases, unknowingly of each other use the same DMRS reference symbols to demodulate their respective ePDCCH messages. As such, "UE specific" should be interpreted as seen from the UEs perspective. RS ports R7 and R9 represent the DMRS reference symbols corresponding to antenna port 107 and 109, respectively. In addition, antenna ports 108 and 110 can be obtained by applying an orthogonal cover (1, −1) over adjacent pairs of RS ports R7 and R9, respectively. The ePDCCH enables precoding gains to be achieved for the control channels. Another benefit of the ePDCCH is that different PRB pairs (or enhanced control regions) can be allocated to different cells or different transmission points within a cell and, as such, inter-cell or inter-point interference coordination between control channels can be achieved. This is especially useful for heterogeneous network scenarios, as discussed below.

The concept of a point is heavily used in conjunction with techniques for Coordinated Multi-Point (CoMP). In this context, a point corresponds to a set of antennas covering essentially the same geographical area in a similar manner. Thus, a point might correspond to one of multiple sectors at a site (i.e., one of two or more sectors of a cell served by an enhanced Node B (eNB)), but it may also correspond to a site having one or more antennas all intending to cover a similar geographical area. Often, different points represent different sites. Antennas correspond to different points when they are sufficiently geographically separated and/or have antenna diagrams pointing in sufficiently different directions. Techniques for CoMP entail introducing dependencies in the scheduling or transmission/reception among different points, in contrast to conventional cellular systems where a point from a scheduling point of view is operated more or less independently from the other points. Downlink CoMP operations may include, for example, serving a certain UE from multiple points, either at different time instances or for a given subframe, on overlapping or non-overlapping parts of the spectrum. Dynamic switching between transmission points serving a certain UE is often termed as Dynamic Point Selection (DPS). Simultaneously serving a UE from multiple points on overlapping resources is often termed as Joint Transmission (JT). Point selection may be based on, for example, instantaneous conditions of the channels, interference, or traffic. CoMP operations are intended to be performed for data channels (e.g., PDSCH) and/or control channels (e.g., ePDCCH).

The same ePDCCH region can be used by different transmission points within a cell or belong to different cells that are not highly interfering with respect to one another. A typical case is the shared cell scenario illustrated in FIG. 7. As illustrated, a heterogeneous network includes a macro node, or macro base station, and multiple lower power pico nodes, or pico base stations, within a coverage area of the macro node. The same ePDCCH region can be used by the macro node and the pico nodes. Note that, throughout this application, nodes or points in a network are often referred to as being of a certain type, e.g., "macro" or "pica." Unless explicitly stated otherwise, this should not be interpreted as an absolute quantification of the role of the node/point in the network but rather as a convenient way of discussing the roles of different nodes/points relative each other. Thus, a discussion about macro and pico nodes/points could for example just as well be applicable to the interaction between micro and femto nodes/points.

For pico nodes that are geographically separated, such as pico nodes B and C, the same ePDCCH region can be re-used. In this manner the total control channel capacity in the shared cell will increase since a given PRB resource is re-used, potentially multiple times, in different parts of the cell. This ensures that area splitting gains are obtained. An example is given in FIG. 8 where pico nodes B and C share the same ePDCCH regions. Conversely, due to proximity, pico nodes A and B and pico nodes A and C are at risk of interfering with each other and, therefore, pico node A is assigned an ePDCCH region that is non-overlapping with the shared ePDCCH regions of the pico nodes B and C. Interference coordination between pico nodes A and B, or equivalently transmission points A and B, within the shared macro cell is thereby achieved. Likewise, interference coordination between pico nodes A and C, or equivalently transmission points A and C, within the shared macro cell is thereby achieved. In some cases, a UE may need to receive part of the ePDCCH signaling from the macro cell and the other part of the ePDCCH signaling from the nearby pico cell. This area splitting and control channel frequency coordination is not possible with the PDCCH since the PDCCH spans the whole bandwidth. Also, the PDCCH does not provide possibility to use UE specific precoding since it relies on the use of CRS for demodulation.

FIG. 9 illustrates an ePDCCH that, similar to the CCE in the PDCCH, is divided into multiple groups and mapped to one of the enhanced control regions of a subframe. Note that in FIG. 9, the ePDCCH regions do not start at OFDM symbol zero in order to accommodate simultaneous transmission of a PDCCH in the subframe. However, there may be carrier types in future LTE releases that do not have a PDCCH, in which case the ePDCCH regions could start from OFDM symbol zero within the subframe.

Even if ePDCCH enables UE specific precoding and localized transmission as discussed above, it can, in some cases, be useful to be able to transmit ePDCCH in a broadcasted, wide area coverage fashion. This is useful if the base station (i.e., eNB) does not have reliable information to perform precoding towards a certain UE. In this situation, a wide area coverage transmission is more robust. Another case is when the particular control message is intended for more than one UE. In this case, UE specific precoding cannot be used. An example is the transmission of the common control information using PDCCH (i.e., in the Common Search Space (CSS)). In any of these cases, a distributed transmission over multiple ePDCCH regions within a subframe can be used. One example of such distribution is illustrated in FIG. 10 where the four parts belonging to the same ePDCCH are distributed over multiple enhanced control regions within a subframe. It has been agreed in the 3GPP ePDCCH development that both distributed and localized transmission of an ePDCCH should be supported. When distributed transmission of ePDCCH is used, it is also beneficial if antenna diversity can be achieved to maximize the diversity order of an ePDCCH message. On the other hand, sometimes only wideband channel quality and wideband precoding information is available at the base station, in which case it could be useful to perform a distributed transmission but with UE specific, wideband precoding.

As discussed above, enhanced control signaling, such as ePDCCH in LTE, offers many advantages. However, advanced network architectures (e.g., heterogeneous network architectures) and downlink CoMP lead to issues that must be solved. In particular, as discussed below, the inventors have found that there is a need for systems and methods for improved channel estimation techniques.

SUMMARY

Systems and methods are disclosed for estimating one or more channel properties of a downlink from a cellular communications network based on quasi co-located antenna ports with respect to the one or more channel properties. In one embodiment, a wireless device receives a downlink subframe including a downlink control channel from the cellular communications network. The wireless device estimates one or more large-scale channel properties for an antenna port of interest in the downlink control channel based on a subset of RSs that correspond to antenna ports in the cellular communications network that are quasi co-located with the antenna port of interest with respect to the one or more channel properties. By estimating the one or more channel properties based on the subset of the RSs that correspond to the quasi co-located antenna ports rather than a single RS that corresponds to the antenna port of interest for which the one or more large-scale channel properties are estimated, estimation of the one or more large-scale channel properties is substantially improved.

In one embodiment, the cellular communications network is a Long Term Evolution (LTE) cellular communications network, and the downlink control channel is an enhanced Public Downlink Control Channel (ePDCCH). In one embodiment, the wireless device does not assume that antenna ports that correspond to RSs in the ePDCCH are quasi co-located with respect to large-scale channel properties between antenna ports and between physical resource blocks within the downlink subframe. In one particular embodiment, the wireless device determines whether a Downlink Control Information (DCI) message in the ePDCCH is associated with two or more Demodulation RS (DMRS) ports and/or two or more physical resource blocks. If so, the antenna ports that are quasi co-located with respect to the one or more channel properties of the RS port within the ePDCCH include antenna ports, and preferably all antenna ports, associated with the DCI message.

In another particular embodiment, ePDCCH resources forming a search space of the wireless device are divided into two or more sets of ePDCCH resources where antenna ports within the same set of ePDCCH resources must be quasi co-located at least with respect to the one or more large-scale channel properties according to one or more predefined rules for the cellular communications network. In this embodiment, the wireless device estimates the one or more large-scale channel properties for the RS port within the ePDCCH based on a subset of the RSs that correspond to antenna ports that are within the same set of ePDCCH resources and, therefore, are quasi co-located with respect to the one or more large-scale channel properties.

In another particular embodiment, ePDCCH resources forming a search space of the wireless device are divided into two or more sets of ePDCCH resources. The wireless device receives signaling from the cellular communications network that indicates whether antenna ports within the same set of ePDCCH resources within the downlink subframe are quasi co-located with respect to the one or more large-scale channel properties. If so, the wireless device estimates the one or more large-scale channel properties for the RS port within the ePDCCH based on a subset of the RSs that correspond to antenna ports that are within the same set of ePDCCH resources and, therefore, are quasi co-located with respect to the one or more large-scale channel properties. In one further embodiment, the wireless device may receive signaling from the cellular communications network that indicates whether antenna ports within two or more different sets of ePDCCH resources within the downlink subframe are quasi co-located with respect to the one or more large-scale channel properties. If the antenna ports within two or more different sets of ePDCCH resources are quasi co-located, then the wireless device estimates the one or more large-scale channel properties for the RS port within the ePDCCH based on the subset of the RSs that correspond to antenna ports that are within the two or more different sets of ePDCCH resources and, therefore, are quasi co-located with respect to the one or more large-scale channel properties.

In one embodiment, a base station in a cellular communications network includes a radio subsystem and a processing subsystem associated with the radio subsystem. The processing subsystem provides, via the radio subsystem, a downlink subframe that includes multiple RSs corresponding to multiple antenna ports according to one or more predefined rules that define one or more subsets of the antenna ports that must be quasi co-located within a downlink control channel of a downlink subframe. In this manner, the base station enables a wireless device to, for example, estimate one or more large-scale channel properties based on a subset of the RSs within the downlink subframe corresponding to antenna ports that are quasi co-located with respect to the one or more large-scale channel properties.

In another embodiment, a base station in a cellular communications network includes a radio subsystem and a processing subsystem associated with the radio subsystem. The processing subsystem sends, via the radio subsystem, information to a wireless device that is indicative of antenna ports that are quasi co-located within a downlink control channel of a subframe of a downlink from the cellular communications network. Using this information, the wireless device is enabled to, for example, estimate one or more large-scale channel properties based on RSs that correspond to antenna ports that are quasi co-located with respect to the one or more large-scale channel properties.

Those skilled in the art will appreciate the scope of the present disclosure and realize additional aspects thereof after reading the following detailed description of the preferred embodiments in association with the accompanying drawing figures.

BRIEF DESCRIPTION OF THE DRAWING FIGURES

The accompanying drawing figures incorporated in and forming a part of this specification illustrate several aspects of the disclosure, and together with the description serve to explain the principles of the disclosure.

Figure 1:
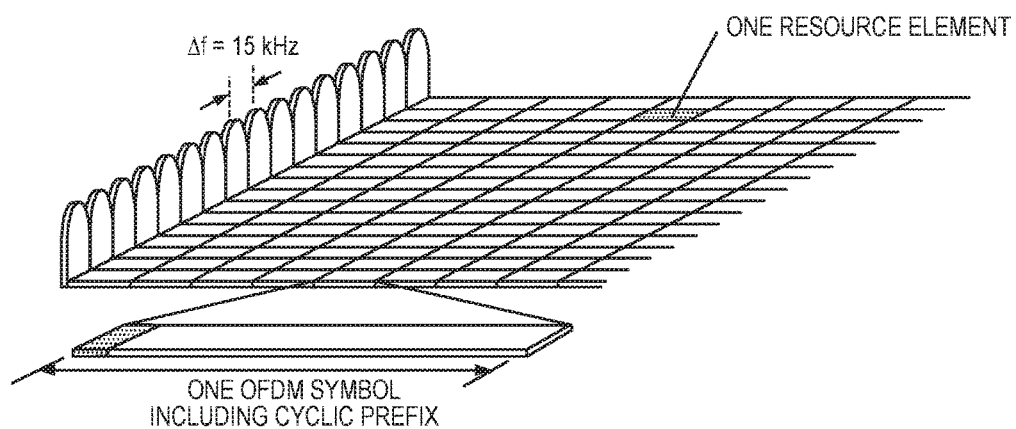
FIG. 1 illustrates a resource block of a downlink in a $3^{rd}$ Generation Partnership Project (3GPP) Long Term Evolution (LTE) cellular communications network.
Figure 2:
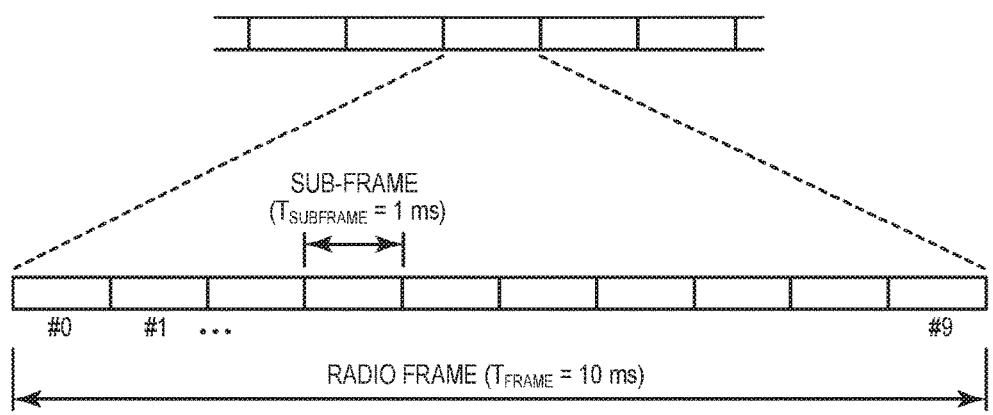
FIG. 2 illustrates the time-domain structure of a downlink in a 3GPP LTE cellular communications network.
Figure 3:
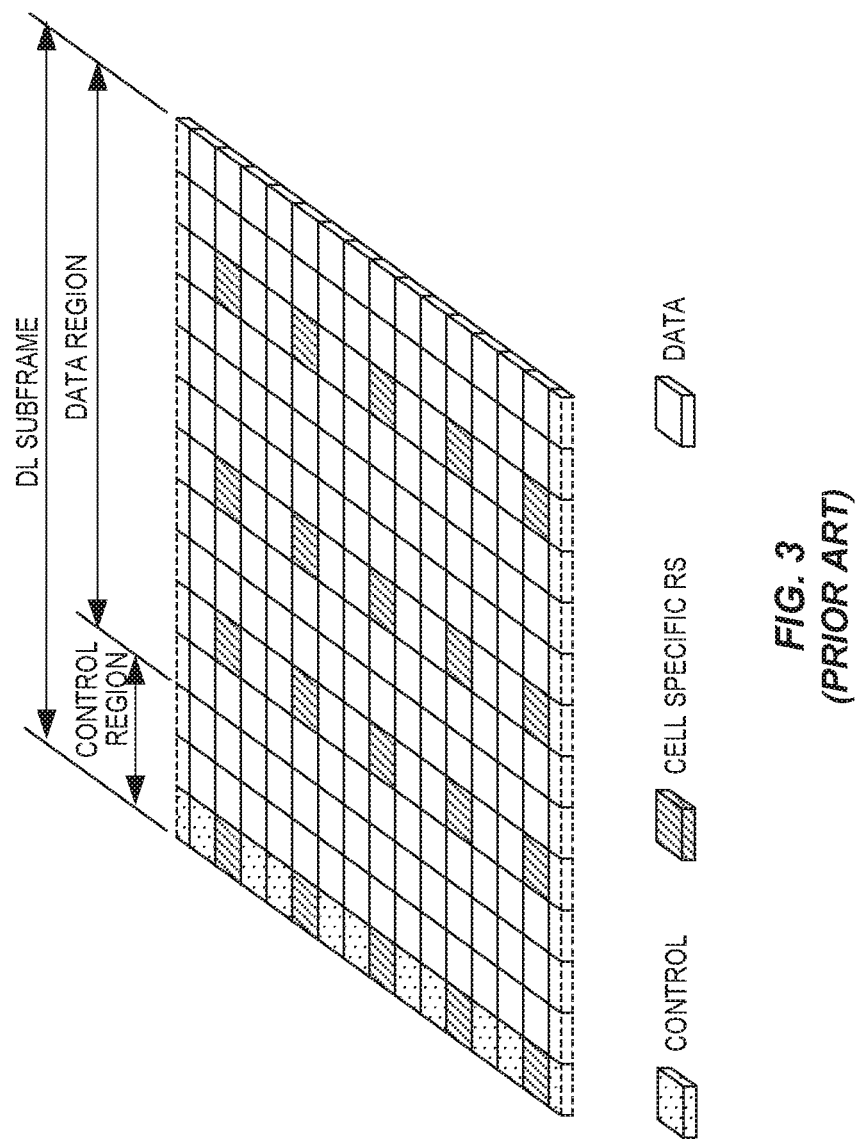
FIG. 3 illustrates mapping of LTE physical control signaling, data link, and Common Reference Signals (CRS) within a downlink subframe in a 3GPP LTE cellular communications network.
Figure 4:
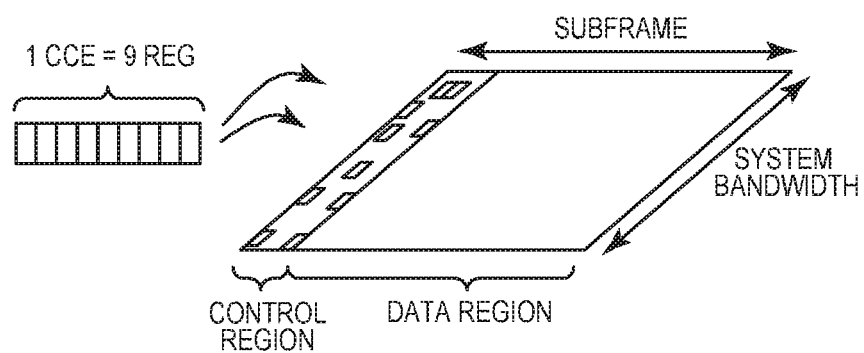
FIG. 4 illustrates mapping of one Control Channel Element (CCE) belonging to a Public Downlink Control Channel (PDCCH) to the control region within a downlink subframe in a 3GPP LTE cellular communications network.
Figure 5:
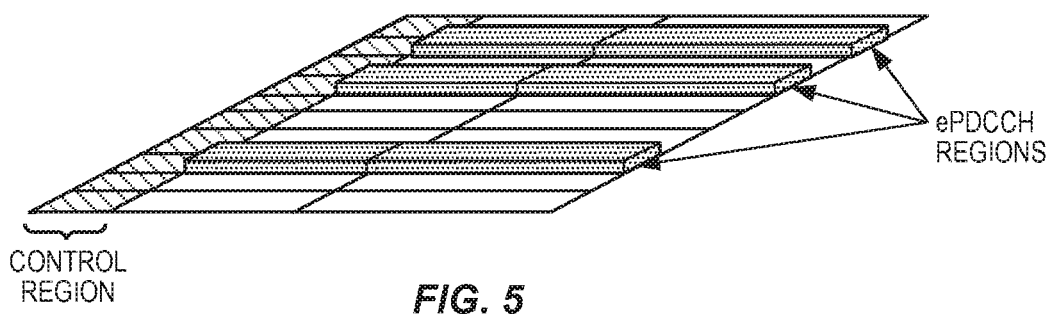
FIG. 5 illustrates enhanced control regions, or enhanced PDCCH (ePDCCH) regions, in a downlink subframe in a 3GPP LTE cellular communications network.
Figure 6:
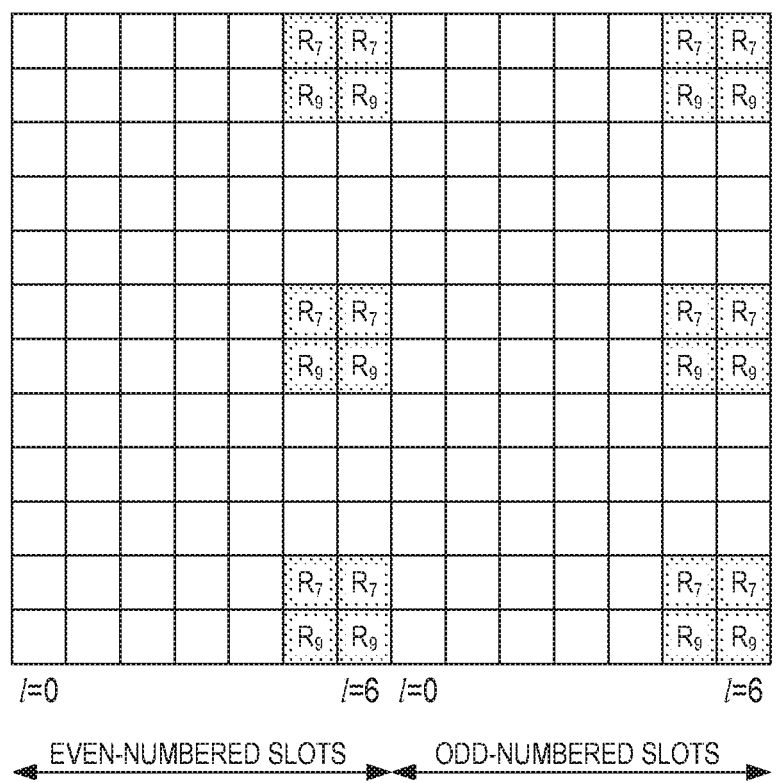
FIG. 6 illustrates an example of Demodulation Reference Signal (DMRS) ports used for ePDCCH, where the DMRS ports correspond to antenna ports.
Figure 7:
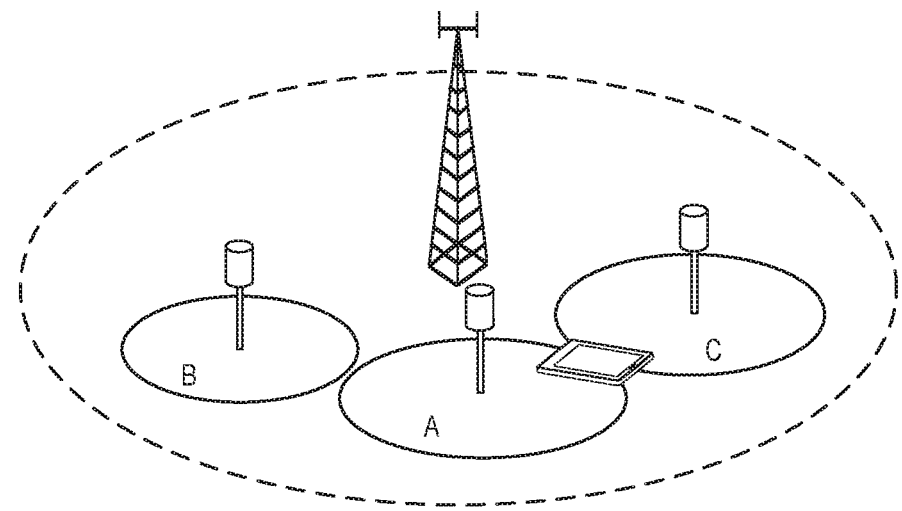
FIG. 7 illustrates a heterogeneous network architecture for a cellular communications network.
Figure 8:
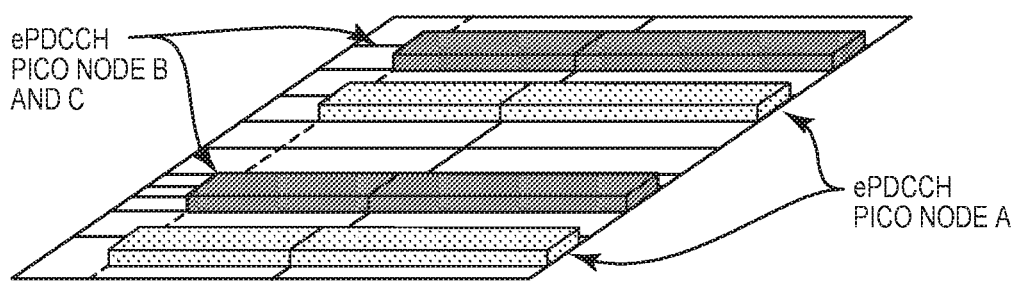
FIG. 8 illustrates different ePDCCH resource regions where some ePDCCH resource regions are reused by pico nodes in the heterogeneous network architecture without interference.
Figure 9:
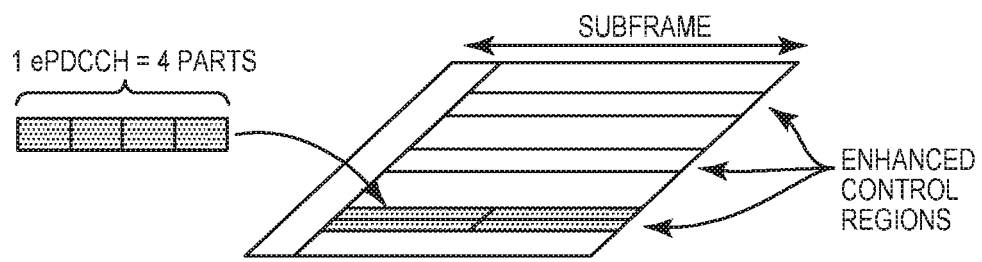
FIG. 9 illustrates a downlink subframe including a CCE belonging to an ePDCCH mapped to one of the ePDCCH regions in the downlink subframe.
Figure 10:
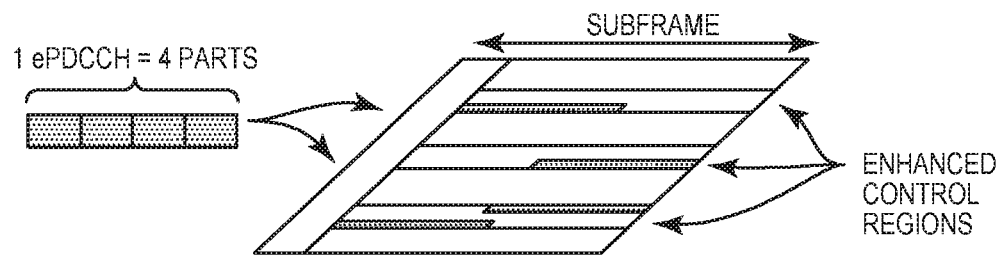
FIG. 10 illustrates a downlink subframe including a CCE belonging to an ePDCCH mapped to multiple ePDCCH regions to achieve distributed transmission and frequency diversity or subband precoding.
Figure 11:
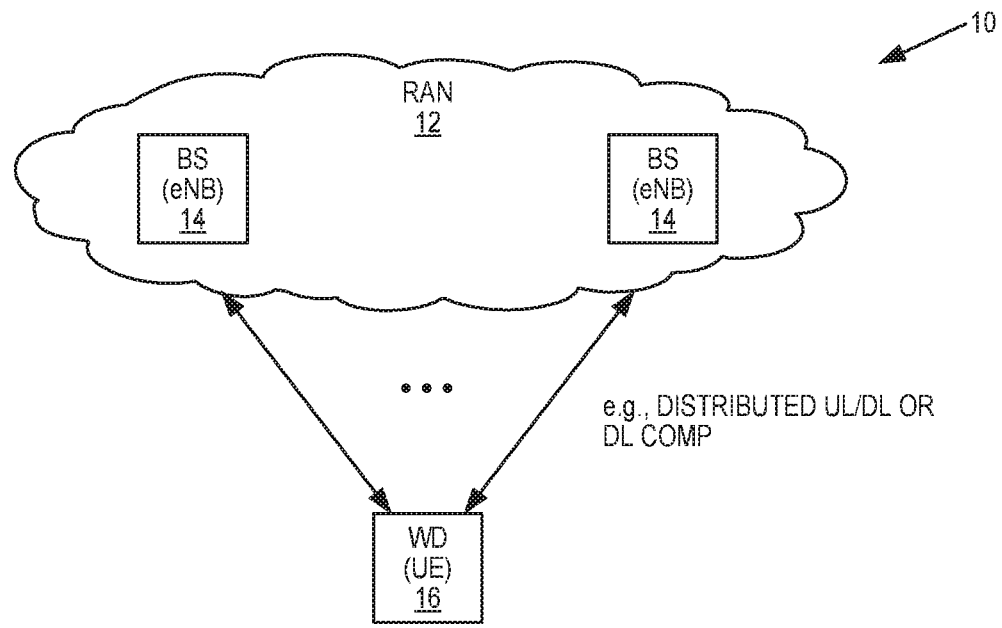
FIG. 11 illustrates a cellular communications network in which a wireless device performs channel estimation for a downlink control channel using reference signals that correspond to quasi co-located antenna ports according to one embodiment of the present disclosure.
Figure 23:
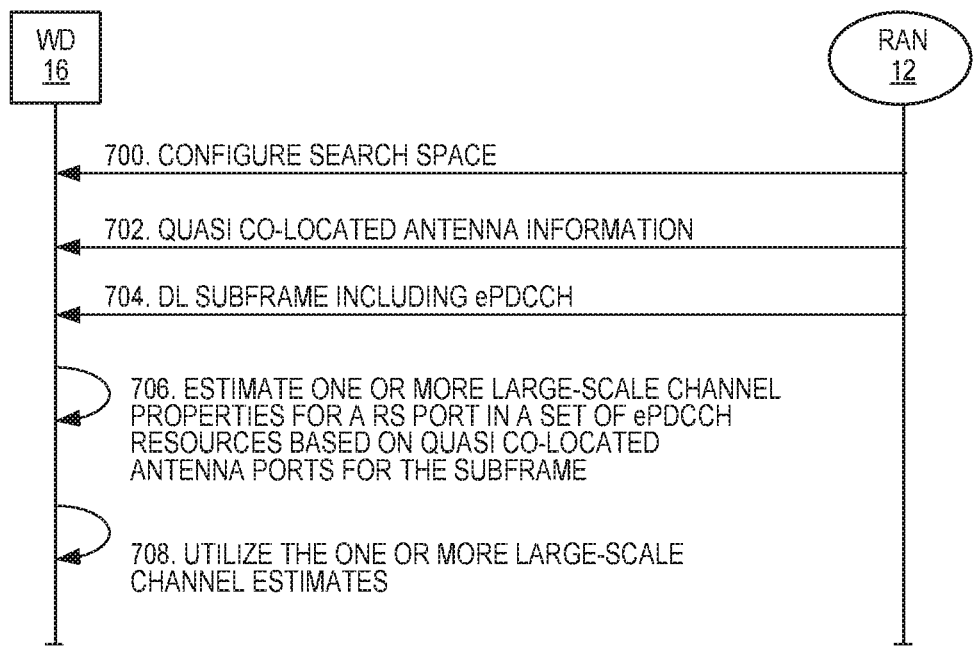
Figure 24:
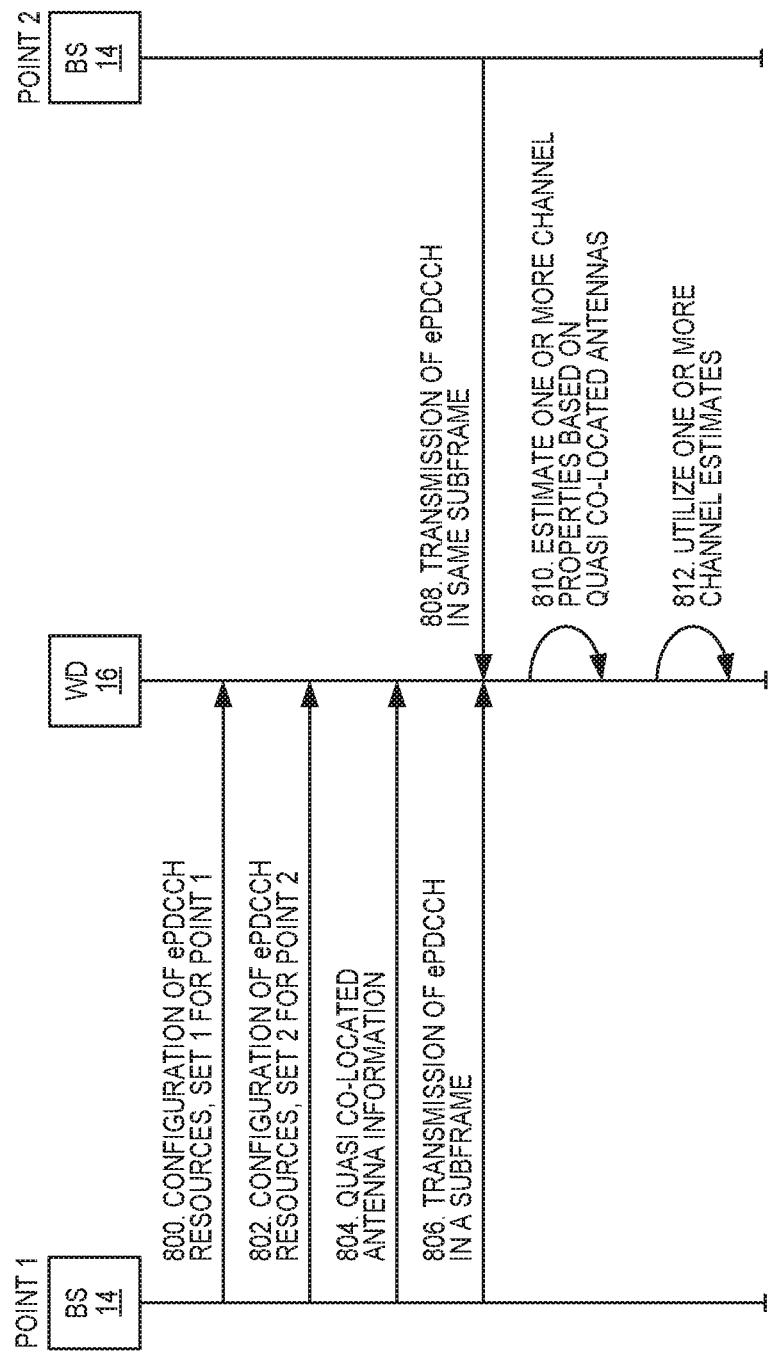
Figure 25:
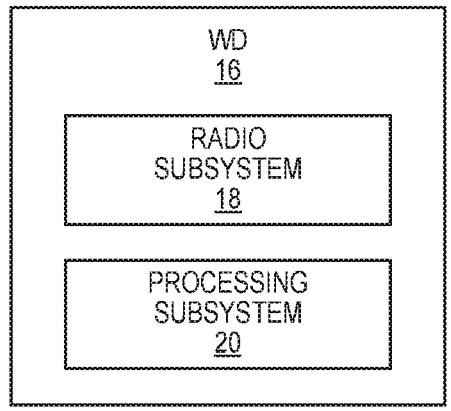
Figure 26:
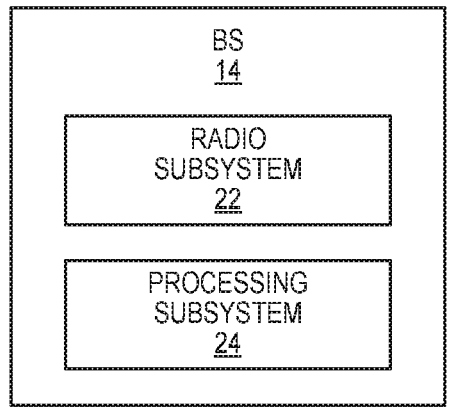

FIG. 23 illustrates the operation of the wireless device of FIG. 11 to perform channel estimation for an RS port within an ePDCCH region based on RSs that correspond to quasi co-located antenna ports according to another embodiment of the present disclosure in which antenna ports within the same set of ePDCCH resources and potentially different sets of ePDCCH resources that are quasi co-located are signaled to the wireless device;

FIG. 24 illustrates one example of the process of FIG. 23 according to one embodiment of the present disclosure;

FIG. 25 is a block diagram of a wireless device according to one embodiment of the present disclosure; and FIG. 26 is a block diagram of a base station according to one embodiment of the present disclosure.

DETAILED DESCRIPTION

The embodiments set forth below represent the necessary information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure and the accompanying claims.

Note that although terminology from the 3$^{rd}$ Generation Partnership Project (3GPP) Long Term Evolution (LTE) specifications is used in much of the description below to exemplify preferred embodiments of the present disclosure, this should not be seen as limiting the scope of the present disclosure to only 3GPP LTE. Other wireless systems such as, but not limited to, Wideband Code Division Multiple Access (WCDMA), Worldwide Interoperability for Microwave Access (WiMax), Ultra Mobile Broadband (UMB), and Global System for Mobile communications (GSM) may also benefit from exploiting the concepts disclosed herein.

Before discussing various embodiments of the present disclosure, a discussion a fundamental problem discovered by the inventors is beneficial. One of the principles guiding the design of the 3GPP LTE cellular communications network is transparency of the network to the User Equipment (UE). In other words, in LTE, the UE is able to demodulate and decode its intended channels without specific knowledge of scheduling assignments for other UEs or network deployments. However, in advanced scenarios such as downlink Coordinated Multi-Point (CoMP) and distributed uplink and downlink, this concept of network transparency results in the fact that the UE cannot assume that reference signals within a subframe originate from the same transmit points in the cellular communications network.

For example, in LTE, different Downlink Control Information (DCI) messages on an enhanced Physical Downlink Control Channel (ePDCCH) may be transmitted from ports belonging to different transmission points. Even though there are several reasons for serving a UE with control signaling from different points, one application consists of distributing parts of the scheduling algorithm at different points such that, for example, downlink (DL) transmissions are associated to a different point than uplink (UL) transmissions. This scenario is referred to herein as a distributed uplink and downlink scenario. In such a case, it makes sense to schedule downlink and uplink transmissions with control signaling provided directly from the respective points. As another example, a UE may be served with parallel data transmissions from different points (e.g., for increasing data rate or during handover between points). As another example, system control information can be transmitted from a "master" point and data transmissions can be transmitted from other points, typically associated with pico nodes. In all the above examples, it makes sense to have the possibility to serve the UE with control signaling on ePDCCH from different points in the same subframe. However, due to network transparency, UEs are not aware of the geographical location from which each Reference Signal (RS) port is transmitted.

Demodulation RSs (DMRSs), or UE specific RSs, are employed for demodulation of data channels and possibly certain control channels (i.e., ePDCCH). A DMRS relieves the UE from having to know many of the properties of the transmission and thus allows flexible transmission schemes to be used from the network side. This is referred to as transmission transparency (with respect to the UE). However, the inventors have found that the estimation accuracy of a DMRS may not be sufficient in some situations.

Geographical separation of RS ports implies that instantaneous channel coefficients from each port towards the UE are in general different. Furthermore, even statistical properties of the channels for different RS ports and RS types may be significantly different. Examples of such statistical properties include received power for each port, delay spread, Doppler spread, received timing (i.e., timing of a first significant channel tap), a number of significant channel taps, frequency shift, average gain, and average delay. In LTE, nothing can be assumed about the properties of the channel corresponding to an antenna port based on the properties of the channel of another antenna port. This is in fact a key part of maintaining transmission transparency.

Based on the above observations, the inventors have found that the UE needs to perform independent estimation for each RS port of interest for each RS. In general, this results in occasionally inadequate channel estimation quality for certain RS ports, leading to undesirable link and system performance degradation. However, the inventors have also found that, even though in general the channel from each antenna port to each UE receive port is substantially unique, some statistical properties and propagation parameters may be common or similar among different antenna ports, depending on whether or not the different antenna ports originate from the same transmit point. Such properties include, for example, a received power level for each antenna port, a delay spread, a Doppler spread, received timing (i.e., timing of a first significant channel tap), frequency shift, average gain, and average delay. Thus, the channel estimation for one RS port may be performed based on other RS ports having sufficiently similar channel properties.

Typically, channel estimation algorithms perform a three step operation. A first step is estimating some statistical properties of the channel. A second step is generating an estimation filter based on the estimated statistical properties. A third step is applying the estimation filter to the received signal in order to obtain channel estimates. The estimation filter may be equivalently applied in the time or the frequency domain. Some channel estimator implementations may not be based on the three step method described above, but still exploit the same principles.

Obviously, accurate estimation of the filter parameters in the first step leads to improved channel estimation. Even though it is often in principle possible for the UE to obtain such filter parameters from observation of the channel over a single subframe and for one RS port, it is usually possible for the UE to improve estimation accuracy of the filter parameters by combining measurements associated with different antenna ports (i.e., different RS transmissions) sharing similar statistical properties. Furthermore, the channel estimation accuracy may be improved by combining RSs associated with multiple PRBs.

Systems and methods are disclosed herein for estimating one or more channel properties of a downlink from a cellular communications network based on quasi co-located antenna ports with respect to the one or more channel properties. In the preferred embodiments described below, systems and methods are disclosed for estimating one or more channel properties for an ePDCCH contained in a downlink subframe from a 3GPP LTE cellular communications network. Again, while the preferred embodiments disclosed herein focus on LTE, the concepts disclosed herein can be utilized for estimating one or more channel properties for a downlink, and in particular a downlink control channel in a downlink subframe, from other types of cellular communications networks.

In one embodiment, a wireless device estimates one or more large-scale channel properties for an antenna port of interest within an ePDCCH of a downlink subframe received from a cellular communications network based on a subset of RSs within the downlink subframe of the downlink. The subset of the RSs used for estimating the one or more large-scale channel properties correspond to antenna ports in the cellular communications network that are quasi co-located with the antenna port of interest with respect to the one or more channel properties of the ePDCCH. Preferably, in addition to the subset of the RSs that correspond to the quasi co-located antenna ports, estimation is also based on a RS that corresponds to the antenna port of interest within the ePDCCH. By estimating the one or more channel properties based on the subset of the RSs that correspond to the quasi co-located antenna ports rather than only the single RS that corresponds to the antenna port for which the one or more large-scale channel properties are estimated, estimation of the one or more large-scale channel properties is substantially improved.

In this regard, FIG. 11 illustrates a cellular communications network 10 that enables channel estimation based on RSs from quasi co-located antenna ports within a subframe according to one embodiment of the present disclosure. In this embodiment, the cellular communications network 10 is a 3GPP LTE cellular communications network. As illustrated, the cellular communications network 10 includes a Radio Access Network (RAN) 12, which itself includes base stations (BSs) 14. The base stations 14 provide service to wireless devices, such as wireless device (WD) 16, located within corresponding service areas, or cells. The base stations 14 included in the RAN 12 can be macro or high power base stations (i.e., enhanced Node Bs (eNBs)), pico or other low power base stations, or a combination thereof.

Figure 12A:
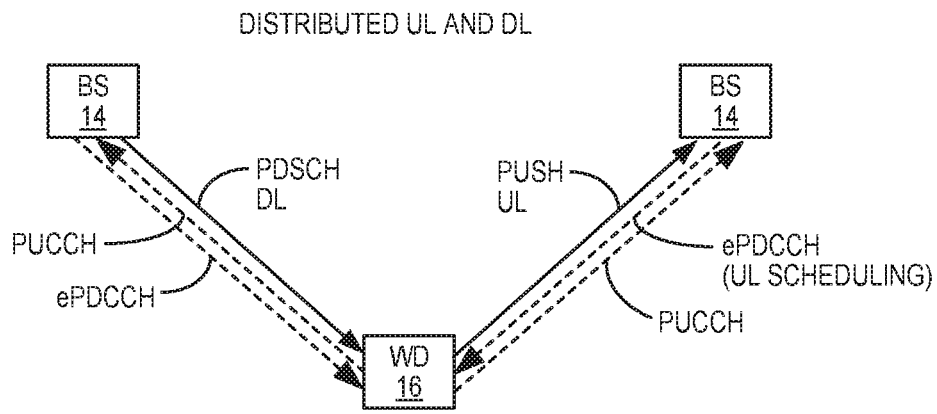
FIG. 12A illustrates one example of a cellular communications network in which reference signals corresponding to quasi co-located antenna ports within a downlink subframe are utilized for channel estimation of a downlink control channel according to one embodiment of the present disclosure.

As illustrated in FIG. 11 and more specifically illustrated in FIG. 12A, in one particular embodiment, the RAN 12 and the WD 16 operate to provide a distributed UL and DL for the WD 16. In particular, uplink data transmissions from the WD 16 (i.e., Physical Uplink Shared Channel (PUSCH)) are directed to and scheduled by a first point (e.g., a first base station 14) in the RAN 12 whereas DL data transmissions to the WD 16 (i.e., Physical Downlink Shared Channel (PDSCH)) are transmitted from and scheduled by a second point (e.g., a second base station 14) in the RAN 12. This may be beneficial, for example, in a heterogeneous network scenario where the uplink data transmissions of the WD 16 are directed to and scheduled by a pico or low power base station 14 and the downlink data transmissions of the WD 16 are transmitted and scheduled by a macro or high power base station 14. In this case, an ePDCCH within a subframe of the downlink to the WD 16 may include both ePDCCH transmission(s) from the pico or low power base station 14 (e.g., an ePDCCH transmission for uplink scheduling) as well as ePDCCH transmission(s) from the macro base station 14 (e.g., an ePDCCH transmission for downlink scheduling).

As discussed below, in order to demodulate the ePDCCH within the subframe, the WD 16 needs to estimate one or more large-scale, or long-term, channel properties for each RS port of interest within the subframe. However, using conventional channel estimation techniques, channel estimation would need to be performed independently for each RS port of interest for each RS. This is because different RS ports for RSs of the same or different RS types within the same subframe can be transmitted from different points in the RAN 12 and, therefore, can have significantly different large-scale channel properties. Further, the same RS port in different Physical Resource Blocks (PRBs) within the same subframe can be transmitted from different points, which again means that the channel properties for those antenna ports can have significantly different large-scale channel properties. As noted above, using conventional channel estimation techniques to independently perform channel estimation for each RS port of interest for each RS would lead to inadequate channel estimation quality for certain RS ports, which would lead to undesirable link and system performance degradation.

In order to improve channel estimation for ePDCCH, the WD 16 performs joint estimation of one or more large-scale channel properties for each RS port of interest within the ePDCCH of a downlink subframe based on RSs within the downlink subframe that correspond to antenna ports that are quasi co-located. As used herein, two antenna ports are "quasi co-located" if the large-scale channel properties of the channel over which a symbol on one antenna port is conveyed can be inferred from the channel over which a symbol on the other antenna port is conveyed. The large-scale channel properties preferably include one or more of delay spread, Doppler spread, Doppler shift, average gain, and average delay. In addition or alternatively, the large-scale channel properties can include one or more of received power for each port, received timing (i.e., timing of a first significant channel tap), a number of significant channel taps, and frequency shift. By performing channel estimation based on the RSs corresponding to the quasi co-located antenna ports, a quality of the channel estimation is substantially improved.

Figure 12B:
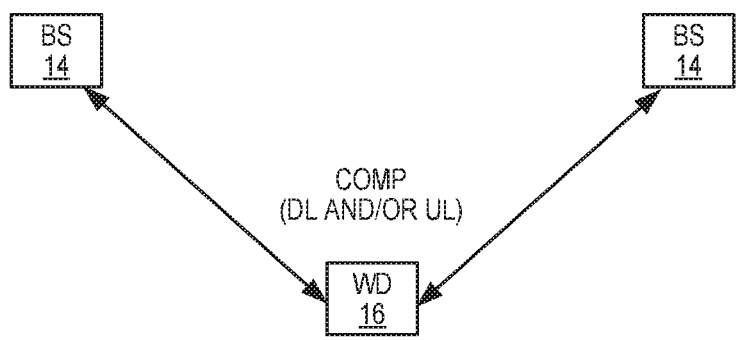
FIG. 12B illustrates another example of a cellular communications network in which reference signals corresponding to quasi co-located antenna ports within a downlink subframe are utilized for channel estimation for a downlink control channel according to one embodiment of the present disclosure.

As illustrated in FIG. 11 and more specifically illustrated in FIG. 12B, in another particular embodiment, the RAN 12 provides downlink CoMP in which the downlink to the WD 16 is provided from multiple base stations 14 in a coordinated manner. In this case, the ePDCCH within a subframe of the downlink to the WD 16 may include ePDCCH transmissions from two or more transmit points (e.g., two or more base stations 14). Again, as discussed below, in order to demodulate the ePDCCH transmissions within the subframe, the WD 16 needs to estimate one or more large-scale, or long-term, channel properties for each RS port of interest within the subframe. However, using conventional channel estimation techniques, channel estimation would need to be performed independently for each RS port of interest for each RS. This would lead to inadequate channel estimation quality for certain RS ports, which would lead to undesirable link and system performance degradation. In order to improve channel estimation for the ePDCCH, the WD 16 performs joint estimation of the large-scale channel properties of each RS port of interest based on RSs within the subframe that correspond to antenna ports that are quasi co-located.

Figure 13:
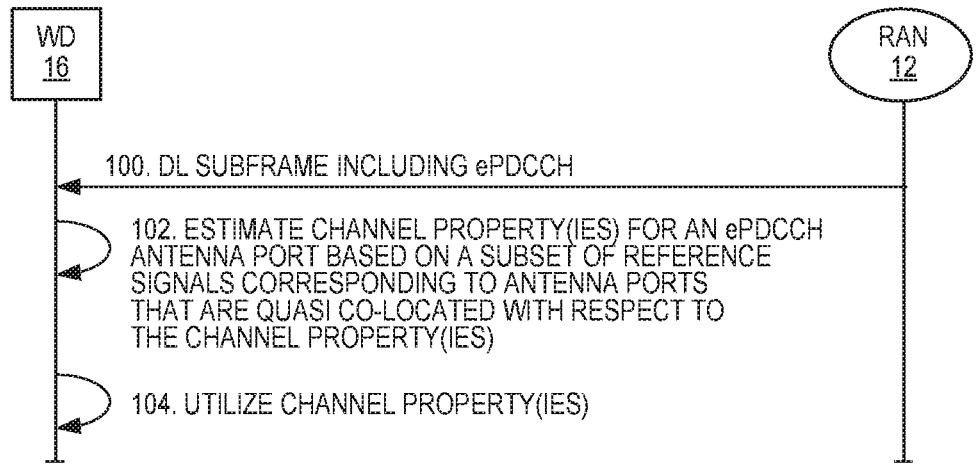
FIG. 13 illustrates the operation of the cellular communications network of FIG. 11 to provide channel estimation for a downlink control channel using reference signals in a downlink subframe corresponding to quasi co-located antenna ports according to one embodiment of the present disclosure.

FIG. 13 illustrates the operation of the cellular communications network 10 of FIG. 11 according to one embodiment of the present disclosure. As illustrated, the WD 16 receives a downlink subframe from the RAN 12, wherein the downlink subframe includes an ePDCCH and multiple RSs within the ePDCCH (step 100). The subframe may contain RS of different types, such as common reference signals (CRS) or channel state information reference signals (CSI-RS). The ePDCCH utilizes PRBs located within one or more ePDCCH resource regions within the subframe. Note that the RSs in the ePDCCH resource regions are more specifically referred to herein as ePDCCH RSs on corresponding ePDCCH RS ports. The RSs in the downlink subframe, and more specifically the ePDCCH RSs in the ePDCCH, can include:

multiple RSs of the same RS type in the same and/or different PRB(s) (e.g., two or more DMRSs on two or more corresponding DMRS ports in the same and/or different PRB(s)); and/or multiple RSs of different RS types on the same and/or different PRB(s) (e.g., a DMRS on a DMRS port and a Channel State Information RS (CSI-RS) on a CSI-RS port in the same and/or different PRB(s)).

Note that CSI-RS and CRS are wideband reference signals. In other words, CSI-RS and CRS found across the entire bandwidth of the downlink and not only in the EPDCCH. As such, when performing channel analysis on, e.g., CSI-RS, the whole bandwidth of CSI-RS can be used, not only the part that resides within the EPDCCH RBs. Due to network transparency, the WD 16 does not assume that any particular RS on any particular RS port is transmitted from the same transmit point across resource blocks within the ePDCCH of the downlink subframe. For example, a DMRS on DMRS port 7 cannot be assumed to be from the same transmit point across different ePDCCH resource regions or even across different PRBs in the same ePDCCH region.

The WD 16 then estimates one or more large-scale channel properties for an antenna port of interest within the downlink subframe based on a subset of the RSs in the subframe and/or previous subframe(s) that correspond to antenna ports that are quasi co-located with the antenna port of interest with respect to the one or more large-scale channel properties (step 102). The antenna port of interest corresponds to an ePDCCH RS port of interest within a PRB in an ePDCCH resource region. In one embodiment, the one or more large-scale channel properties are one or more large-scale channel properties of a channel between a transmit point from which the antenna port of interest within the PRB originated and the WD 16. The one or more large-scale channel properties preferably include one or more of delay spread, Doppler spread, Doppler shift, average gain, and average delay. In addition or alternatively, the one or more large-scale channel properties can include one or more of received power for each port, received timing (i.e., timing of a first significant channel tap), a number of significant channel taps, and frequency shift.

Estimation of the one or more large-scale channel properties may be performed using any suitable joint estimation technique that utilizes the quasi co-located antenna ports to estimate the large-scale channel properties for the desired antenna port. The estimation is preferably based on the RS that corresponds to the antenna port of interest within the downlink subframe as well as the RSs that correspond to the antenna ports that are quasi co-located with the antenna port of interest with respect to the large-scale channel properties. The RSs that correspond to the antenna ports that are quasi co-located with the antenna port of interest with respect to the large-scale channel properties can include RSs within the same downlink subframe as the antenna port of interest and/or RSs within one or more previous downlink subframes. Using RSs in one or previous subframes may be beneficial where, for example, CSI-RS are not transmitted in the downlink subframe of the antenna port of interest. Notably, the estimates generated in step 102 may be initial estimates for the one or more large-scale channel properties or updated estimates of the one or more large-scale channel properties. For instance, estimation/updating across multiple subframes can be used to improve the estimates of the one or more large-scale channel properties.

Lastly, the WD 16 utilizes the one or more large-scale channel properties, or more specifically utilizes the estimates of the one or more large-scale channel properties (step 104). More specifically, in one embodiment, the WD 16 utilizes the estimates of the one or more large-scale channel properties to configure one or more parameters of an estimation filter that is applied by the WD 16 in the time or the frequency domain to perform the channel estimate used to receive the downlink signal to enable reception and demodulation of the ePDCCH.

Figure 14:
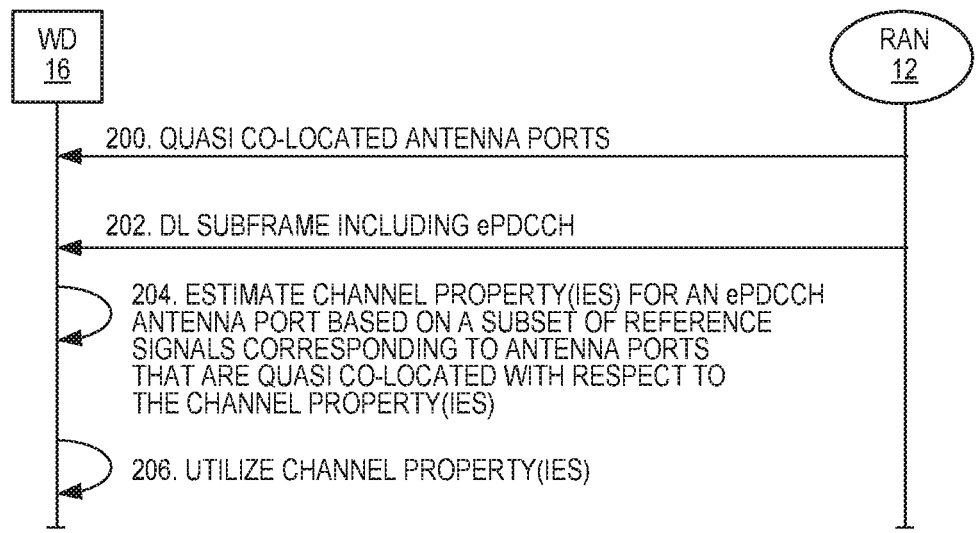
FIG. 14 illustrates the operation of the cellular communications network of FIG. 11 to provide channel estimation for a downlink control channel using reference signals corresponding to quasi co-located antenna ports in which the quasi co-located antenna ports are signaled by the cellular communications network according to one embodiment of the present disclosure.
Figure 15:
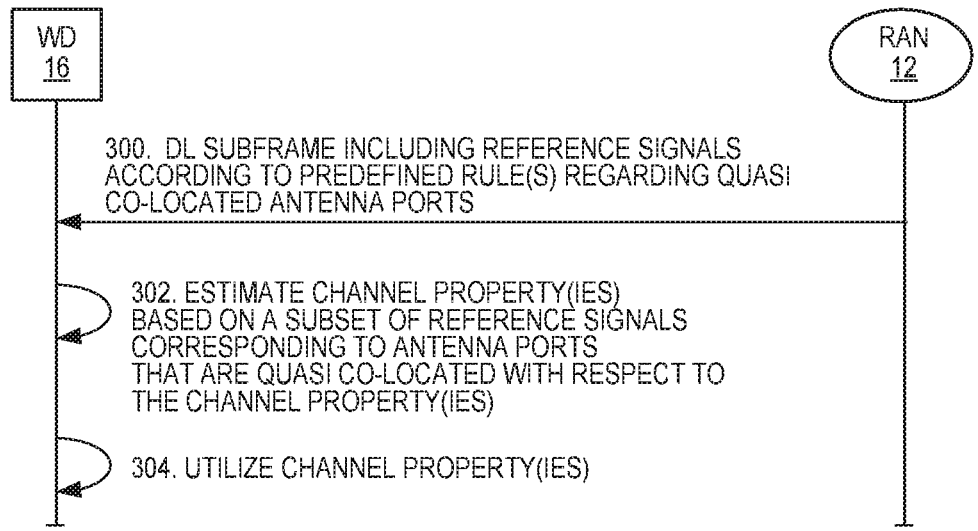
FIG. 15 illustrates the operation of the cellular communications network of FIG. 11 to provide channel estimation for a downlink control channel using reference signals corresponding to quasi co-located antenna ports in which the quasi co-located antenna ports are predefined for the cellular communications network according to one embodiment of the present disclosure.

In 3GPP LTE, a key feature of the cellular communications network 10 is network transparency. As a result of network transparency, the WD 16 is not aware of the points in the RAN 12 from which the different antenna ports originate. As such, in order for the WD 16 to estimate the one or more large-scale channel properties in step 102 of FIG. 13, the WD 16 must have knowledge of which antenna ports are quasi co-located with the antenna port of interest with respect to the one or more large-scale channel properties. FIGS. 14 and 15 illustrate two embodiments in which the WD 16 obtains knowledge of the antenna ports that are quasi co-located via signaling from the RAN 12 and via predefined rule(s) for the cellular communications network 10.

More specifically, referring to FIG. 14, the WD 16 receives information from the RAN 12 that is indicative of antenna ports that are quasi co-located (step 200). In the preferred embodiment, the information from the RAN 12 is indicative of antenna ports that are quasi co-located with respect to ePDCCH. This information may be explicitly signaled to the WD 16 from the RAN 12 via Radio Resource Control (RRC) signaling or the like. Alternatively, this information may be implicitly signaled to the WD 16 from the RAN 12 via, for example, DCI messages transmitted in the ePDCCH. The information from the RAN 12 indicates which antenna ports are quasi co-located with respect to one or more large-scale channel properties and physical resources over which those antenna ports are quasi co-located with respect to the one or more large-scale channel properties. In one particular embodiment, the information from the RAN 12 indicates which antenna ports are quasi co-located with respect to one or more large-scale channel properties within a subframe of a downlink to the WD 16 and physical resources with the subframe over which those antenna ports are quasi co-located with respect to the one or more large-scale channel properties.

From this point, the process continues as described above with respect to steps 100-104 of FIG. 13. More specifically, the WD 16 receives a downlink subframe from the RAN 12, wherein the downlink subframe includes an ePDCCH and multiple RSs within the ePDCCH (step 202). The WD 16 then estimates one or more large-scale channel properties for an antenna port of interest within a subframe based on a subset of the RSs in the subframe and/or a previous subframe(s) that correspond to antenna ports that are quasi co-located with the antenna port of interest with respect to the one or more large-scale channel properties (step 204). The antenna port of interest corresponds to an ePDCCH RS port of interest within a PRB in an ePDCCH resource region. Here, the antenna ports that are quasi co-located with respect to the one or more large-scale channel properties are indicated by the information received from the RAN 12 in step 200. In one embodiment, the one or more large-scale channel properties are one or more large-scale channel properties of a channel between a transmit point from which the antenna port of interest originated and the WD 16. The one or more large-scale channel properties preferably include one or more of delay spread, Doppler spread, Doppler shift, average gain, and average delay. In addition or alternatively, the one or more large-scale channel properties can include one or more of received power for each port, received timing (i.e., timing of a first significant channel tap), a number of significant channel taps, and frequency shift.

Estimation of the one or more large-scale channel properties may be performed using any suitable joint estimation technique that utilizes the quasi co-located antenna ports to estimate the large-scale channel properties for the desired antenna port. The estimation is preferably based on the RS that corresponds to the antenna port of interest of the downlink subframe as well as the RSs that correspond to the antenna ports that are quasi co-located with the antenna port of interest with respect to the large-scale channel properties. The RSs that correspond to the antenna ports that are quasi co-located with the antenna port of interest with respect to the large-scale channel properties can include RSs within the same downlink subframe as the antenna port of interest and/or RSs within one or more previous downlink subframes. Using RSs in one or previous subframes may be beneficial where, for example, CSI-RS are not transmitted in the downlink subframe of the antenna port of interest. Notably, the estimates generated in step 204 may be initial estimates for the one or more large-scale channel properties or updated estimates of the one or more large-scale channel properties. For instance, estimation/updating across multiple subframes can be used to improve the estimates of the one or more large-scale channel properties.

Lastly, the WD 16 utilizes the one or more large-scale channel properties, and more specifically utilizes the estimates of the one or more large-scale channel properties (step 206). More specifically, in one embodiment, the WD 16 utilizes the estimates of the one or more large-scale channel properties to configure one or more parameters of an estimation filter that is applied by the WD 16 in the time or the frequency domain to perform channel estimation required for the reception and demodulation of the ePDCCH.

FIG. 15 illustrates the operation of the cellular communications network 10 of FIG. 11 in which quasi co-located antenna ports are predefined for the cellular communications network 10 according to one embodiment of the present disclosure. In one particular embodiment, the quasi co-located antenna ports are defined by one or more specifications (i.e., 3GPP specifications) that define the operation of the cellular communications network 10. Thus, in this embodiment, the RAN 12 transmits a downlink including RSs to the WD 16 according to one or more predefined rules that define antenna ports that must be quasi co-located (step 300). More specifically, the downlink includes a downlink subframe that includes an ePDCCH. The RS ports of the RSs transmitted in the ePDCCH correspond to antenna ports. The one or more predefined rules define which of the antenna ports must be quasi co-located for the ePDCCH. Thus, in other words, the one or more predefined rules define which of the RSs in the ePDCCH must originate from quasi co-located antenna ports. For example, as discussed below in detail, in one embodiment, ePDCCH resources within a subframe are divided into two or more sets of ePDCCH resources where the WD 16 is configured to search at least two of the sets of ePDCCH resources. In this example, the one or more predefined rules may state, for example, that antenna ports corresponding to all RS ports in the same set of ePDCCH resources must be quasi co-located. Note, however, that this example is not limiting. The rules may define antenna ports that must be quasi co-located in any desired manner.

The WD 16 then estimates one or more large-scale channel properties for an antenna port of interest of the subframe based on a subset of the RSs in the subframe and/or a previous subframe(s) that correspond to antenna ports that are quasi co-located with the antenna port of interest with respect to the one or more large-scale channel properties (step 302). The antenna port of interest corresponds to an ePDCCH RS port of interest within a PRB in an ePDCCH resource region. Here, the antenna ports that are quasi co-located with respect to the one or more large-scale channel properties are predefined for the cellular communications network 10. In one embodiment, the one or more large-scale channel properties are one or more large-scale channel properties of a channel between a transmit point from which the antenna port of interest originated and the WD 16. The one or more large-scale channel properties preferably include one or more of delay spread, Doppler spread, Doppler shift, average gain, and average delay. In addition or alternatively, the one or more large-scale channel properties can include one or more of received power for each port, received timing (i.e., timing of a first significant channel tap), a number of significant channel taps, and frequency shift.

Estimation of the one or more large-scale channel properties may be performed using any suitable joint estimation technique that utilizes the quasi co-located antenna ports to estimate the large-scale channel properties for the desired antenna port. The estimation is preferably based on the RS that corresponds to the antenna port of interest of the downlink subframe as well as the RSs that correspond to the antenna ports that are quasi co-located with the antenna port of interest with respect to the large-scale channel properties. The RSs that correspond to the antenna ports that are quasi co-located with the antenna port of interest with respect to the large-scale channel properties can include RSs within the same downlink subframe as the antenna port of interest and/or RSs within one or more previous downlink subframes. Using RSs in one or previous subframes may be beneficial where, for example, CSI-RS are not transmitted in the downlink subframe of the antenna port of interest. Notably, the estimates generated in step 302 may be initial estimates for the one or more large-scale channel properties or updated estimates of the one or more large-scale channel properties. For instance, estimation/updating across multiple subframes can be used to improve the estimates of the one or more large-scale channel properties.

Lastly, the WD 16 utilizes the one or more large-scale channel properties, or more specifically utilizes the estimates of the one or more large-scale channel properties (step 304). More specifically, in one embodiment, the WD 16 utilizes the one or more large-scale channel properties to configure one or more parameters of an estimation filter that is applied by the WD 16 in the time or the frequency domain to the received downlink signal to perform channel estimation required for the reception and demodulation of the ePDCCH.

Figure 16:
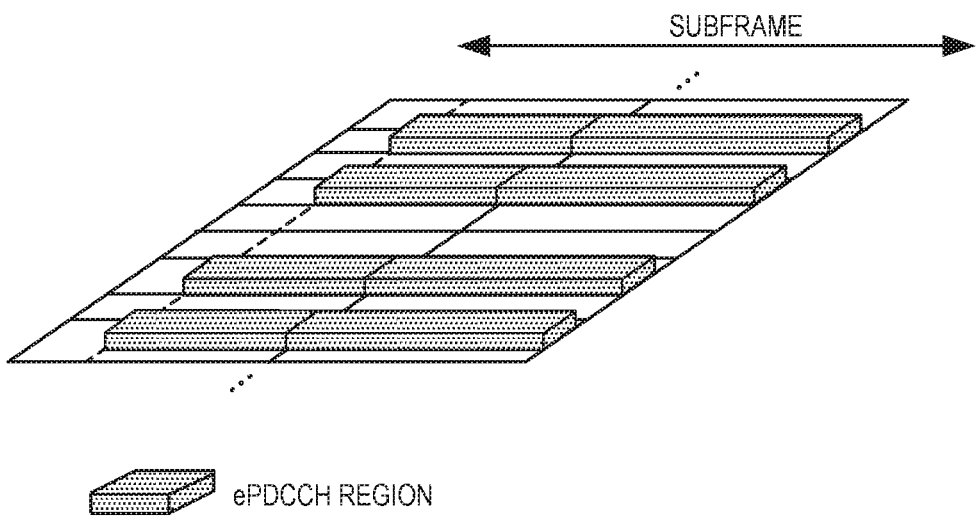
FIG. 16 illustrates multiple ePDCCH resource regions within a subframe.

In preferred embodiments of the present disclosure, channel estimation is performed for RS ports in ePDCCH resource regions within a subframe of a downlink from the RAN 12. Before discussing further details of these preferred embodiments, a discussion of ePDCCH resource regions within a subframe and various RSs and corresponding antenna ports that can be found in the ePDCCH resource regions is provided. In this regard, FIG. 16 illustrates a subframe of an LTE downlink that includes multiple ePDCCH resource regions. In this example, each ePDCCH resource region includes a portion of a PRB in the first half of the subframe (i.e., the first slot of the subframe) and a PRB in the second half of the subframe (i.e., the second slot of the subframe). Note that, in another embodiment, there are no Orthogonal Frequency Division Multiplexing (OFDM) symbol intervals reserved for control information (e.g., PDCCH) at the start of the subframe, and each ePDCCH resource region includes a full PRB pair. Note that while four ePDCCH resource regions are illustrated in the example of FIG. 16, any number of ePDCCH resource regions may be included in the subframe.

Figure 17A:
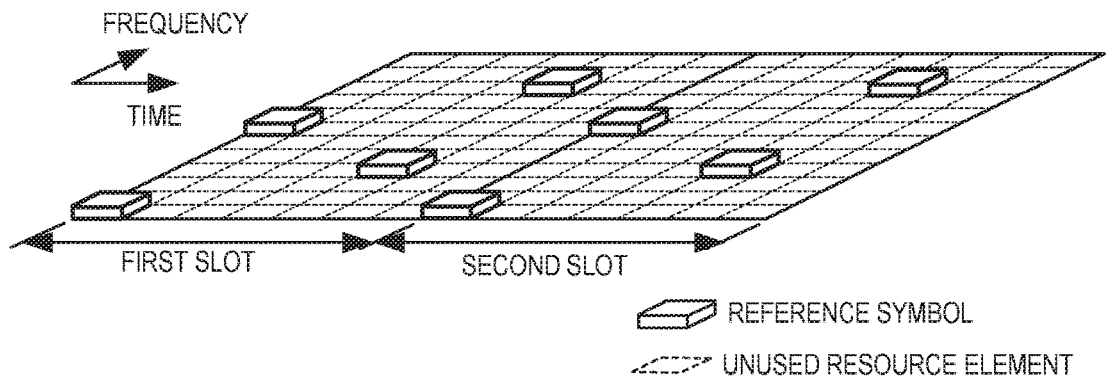
FIGS. 17A through 17C illustrate different CRS ports that correspond to different antenna ports that are found in the ePDCCH resource regions of FIG. 16.
Figure 17B:
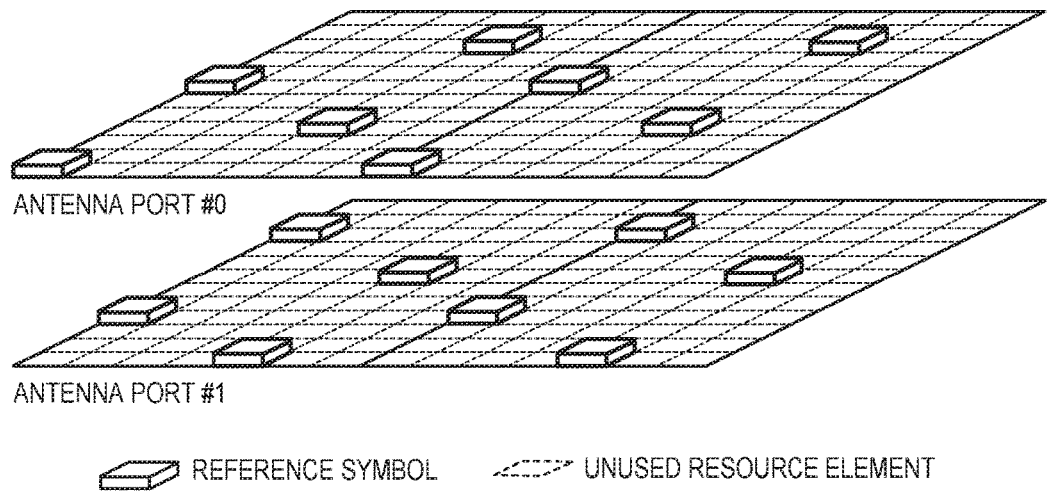
Figure 17C:
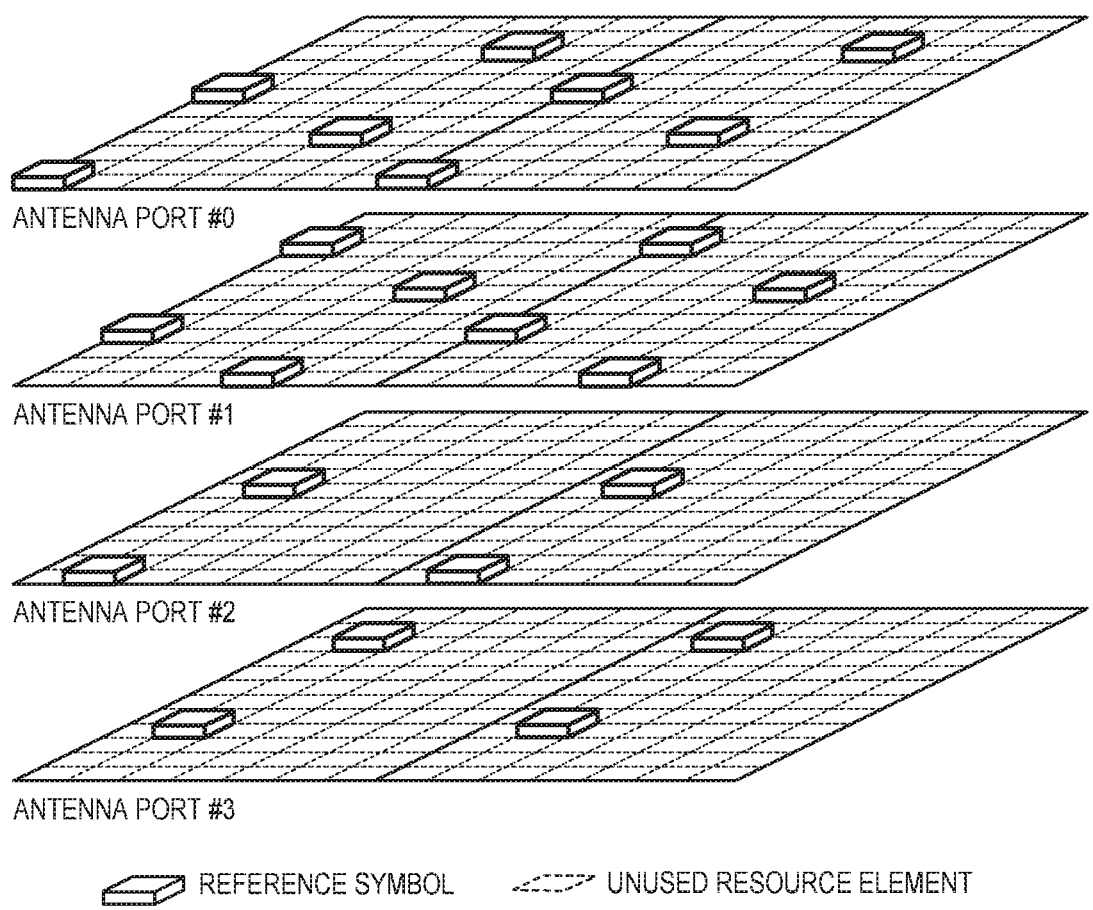

FIGS. 17A through 17C illustrate a Common Reference Signal (CRS) within a pair of PRBs in a subframe. A CRS is cell-specific RS that consists of CRS reference symbols of predefined values inserted at time and frequency locations within the PRBs in each subframe. FIG. 17A illustrates a CRS port that corresponds to a single antenna port. In contrast, FIGS. 17B and 17C illustrate CRS ports corresponding to two and up to four antenna ports, respectively. As such, depending on the particular configuration, each ePDCCH region within a subframe may include from one up to four CRS ports (i.e., from one up to four antenna ports carrying CRSs).

Figure 18A:
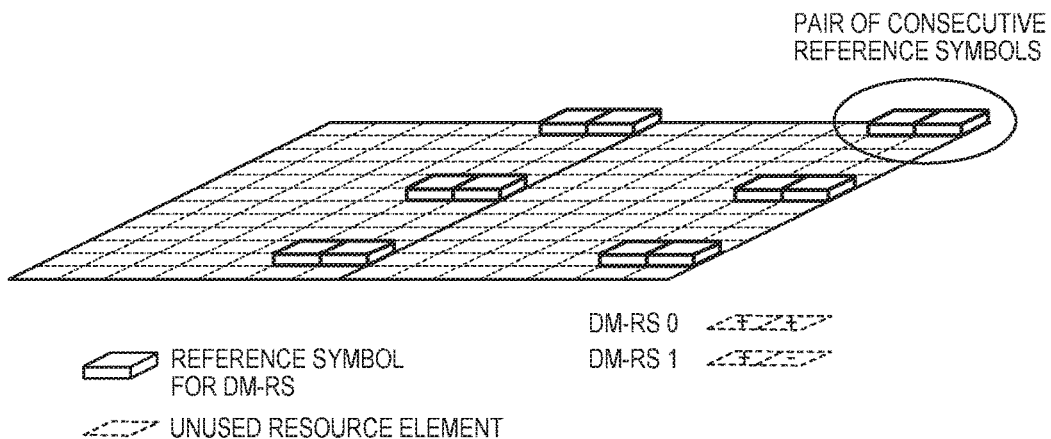
FIGS. 18A and 18B illustrate different Demodulation Reference Signal (DMRS) ports that correspond to different antenna ports that are found in the ePDCCH resource regions of FIG. 16.
Figure 18B:
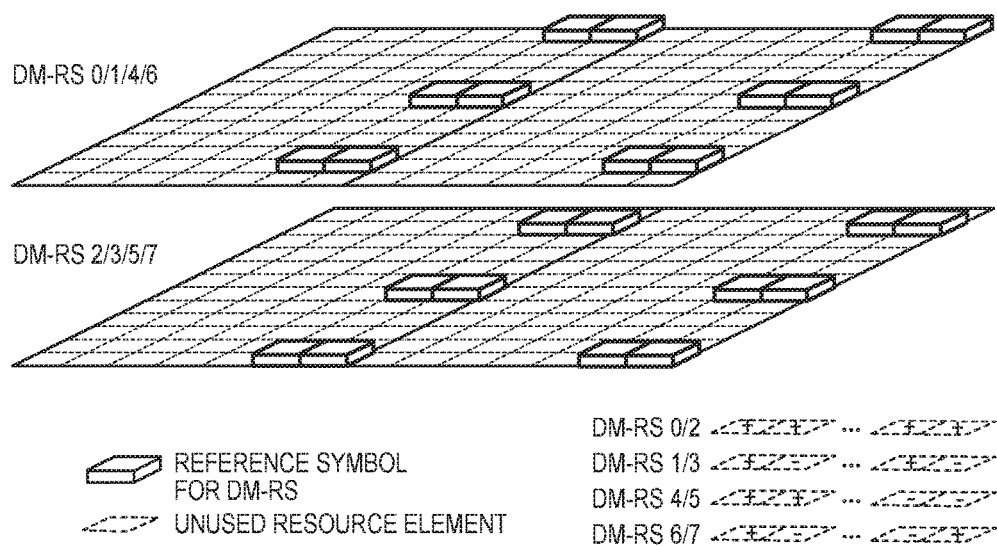

FIGS. 18A and 18B illustrate DMRS ports within a pair of PRBs in a subframe. A DMRS is a UE specific RS transmitted in PRBs assigned to that specific UE. DMRSs are intended to be used for channel estimation for PDSCH transmissions particularly for non-codebook-based precoding. A DMRS includes DMRS reference symbols of known values at known time and frequency locations within the PRBs in the subframe. FIG. 18A illustrates two DMRS ports using 12 DMRS resource elements (REs), where the two DMRS ports correspond to two antenna ports. Conversely, FIG. 18B illustrates eight DMRS ports using 24 DMRS REs, where the eight DMRS ports correspond to eight antenna ports. Thus, depending on the particular configuration, each ePDCCH region within a subframe may include from one up to eight DMRS ports corresponding to from one up to eight antenna ports.

Figure 19:
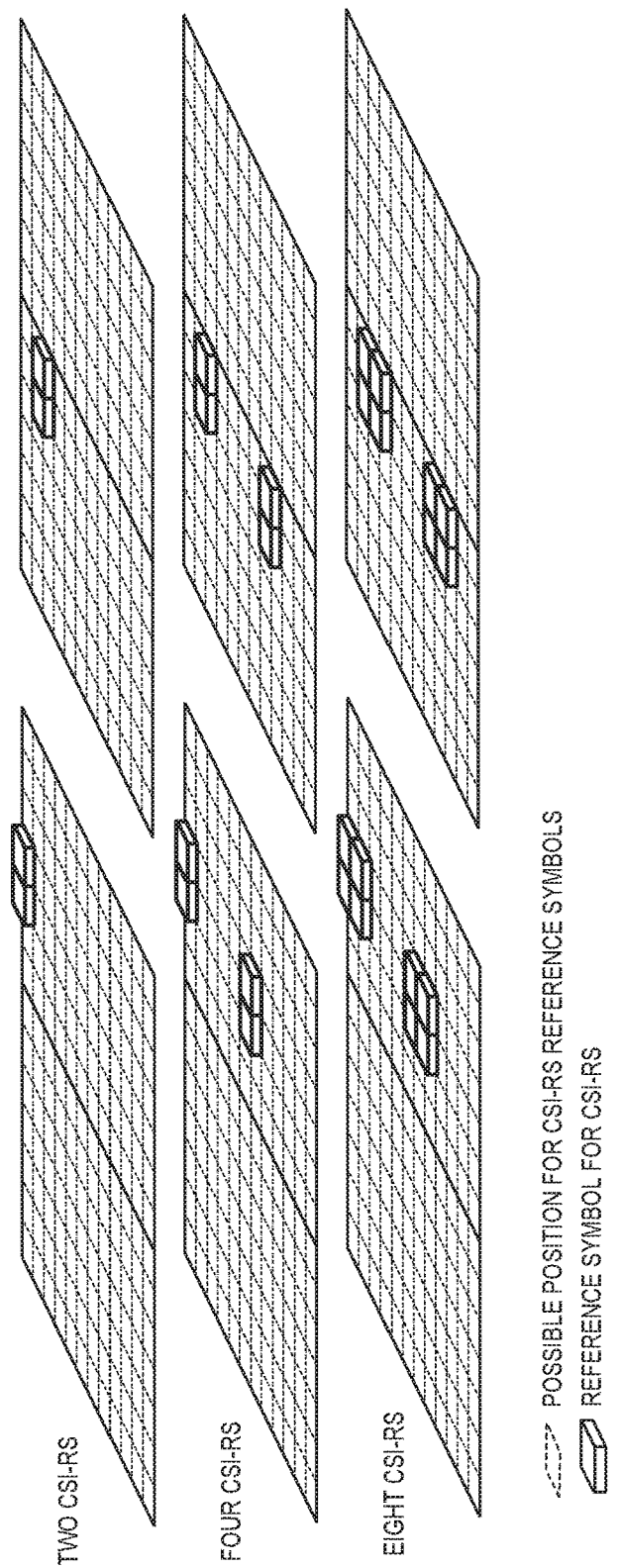
FIG. 19 illustrates different Channel State Information Reference Signal (CSI-RS) ports that correspond to different antenna ports that are found in the ePDCCH resource regions of FIG. 16.

FIG. 19 illustrates CSI-RS ports within a pair of PRBs in a subframe. As illustrated, there can be from one up to eight CSI-RSs within the pair of PRBs in the subframe on one up to eight CSI-RS ports, respectively. Each CSI-RS port is using two resource elements in the PRB pair. CSI-RS(s) can be utilized by a WD to acquire channel-state information when DMRSs are used for channel estimation (e.g., in transmission mode 9 of LTE Rel-10 and Rel-11). A CSI-RS includes CSI-RS reference symbols of known values at known time and frequency locations within the PRBs for the corresponding CSI-RS port. As the CSI-RS(s) are transmitted in all PRBs of the system bandwidth, corresponding CSI-RS ports within the ePDCCH resource regions of FIG. 16 can be found. Depending on the particular configuration, each ePDCCH resource region within a subframe may include from one up to eight CSI-RS ports corresponding to from one up to eight antenna ports.

Figure 20:
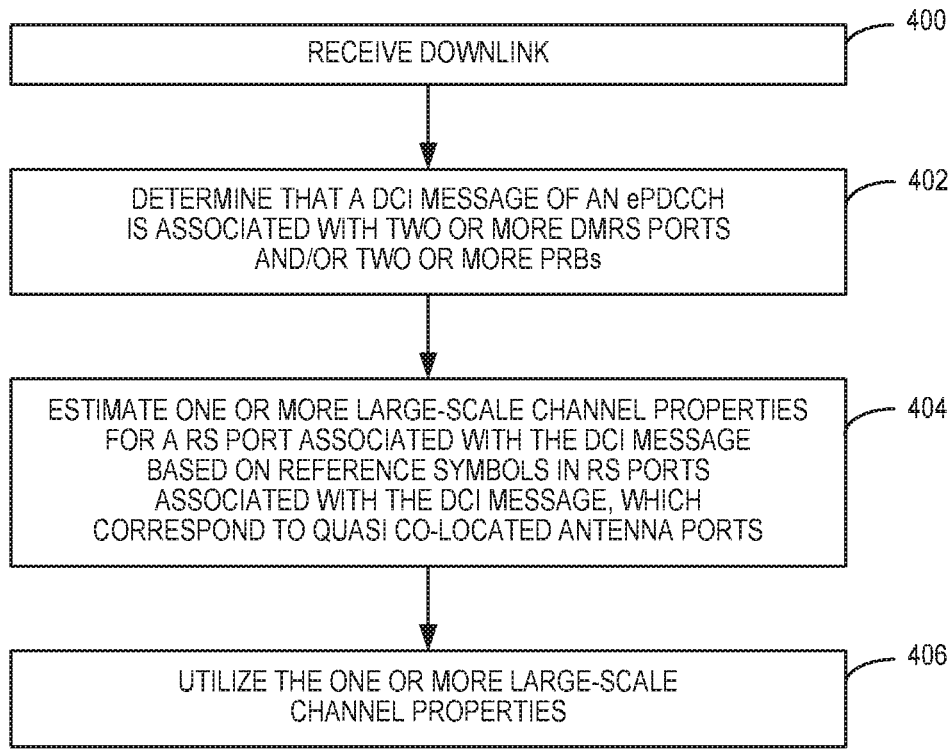
FIG. 20 illustrates the operation of the wireless device of FIG. 11 to perform channel estimation for a Reference Signal (RS) port within an ePDCCH region based on RSs that correspond to quasi co-located antenna ports according to one embodiment of the present disclosure.

FIG. 20 illustrates the operation of the WD 16 to estimate one or more large-scale channel properties for an RS port of interest (or correspondingly an antenna port of interest) within an ePDCCH resource region of a subframe using RSs that correspond to quasi co-located antenna ports according to one embodiment of the present disclosure. In this embodiment, the WD 16 does not assume that the antenna ports corresponding to DMRS ports are quasi co-located with respect to any of the large-scale channel properties between DMRS ports and between PRBs within a subframe. In this embodiment, the WD 16 receives a downlink from the RAN 12 (step 400) and determines that a DCI message of an ePDCCH in a subframe of the downlink is associated with two or more DMRS ports (e.g., for spatial diversity transmission) and/or two or more PRBs (step 402). In this case, the DCI message is an implicit signaling from the RAN 12 that all antenna ports associated with the DCI message are quasi co-located for the subframe. In other words, the WD 16 can infer from the DCI message that all antenna ports associated with the DCI message are quasi co-located for the subframe. As such, the WD 16 estimates one or more large-scale channel properties for the RS port of interest in the ePDCCH based on reference symbols in RS ports associated with the DCI message, where the RS ports associated with the DCI message correspond to quasi co-located antenna ports (step 404). Lastly, the WD 16 utilizes the one or more large-scale channel properties, as discussed above (step 406).

Notably, the estimates of the large-scale channel properties can be used for channel estimation using DMRS. However, channel estimation algorithms use Doppler shift, delay spread, and other large-scale channel properties. These large-scale channel properties can be obtained from, for example, CSI-RS(s) since CSI-RSs are wideband and periodic in time. However, in order to obtain the proper estimates of the channel properties, the WD 16 must be ensured that the estimates of the large-scale channel properties obtained using CSI-RS(s) actually reflect the same channel as the DMRS(s) of interest. This is done by, for example, estimating the desired large-scale channel properties for the DMRS port of interest utilizing CSI-RS ports that are quasi co-located with the DMRS port of interest.

When estimating the one or more large-scale channel properties based on CSI-RS(s) that are quasi co-located with a DMRS port of interest, the WD 16 can determine which CSI-RS(s) are quasi co-located with the DMRS port of interest in any suitable manner. For instance, the WD 16 may be configured to receive two CSI-RS(s) (i.e., two CSI-RS ports). The WD 16 can then determine which CSI-RS port(s) are quasi co-located with a DMRS port of interest based on resource allocation (i.e., which ePDCCH resources are received by the WD 16, which is indicated by the DCI message). Thus, the CSI-RS(s) associated with the DCI message can be used to estimate the large-scale channel properties for the DMRS port of interest. In another embodiment, the WD 16 can determine which CSI-RS port(s) are quasi co-located with a DMRS port of interest based on the type of transmission scheme. More specifically, the ePDCCH can be transmitted in localized mode or distributed mode. Then, DMRS ports for located ePDCCH reception can be defined as being quasi co-located with a first CSI-RS port(s) and any DMRS ports for distributed ePDCCH reception can be defined as being quasi co-located with a second CSI-RS port(s).

Figure 21:
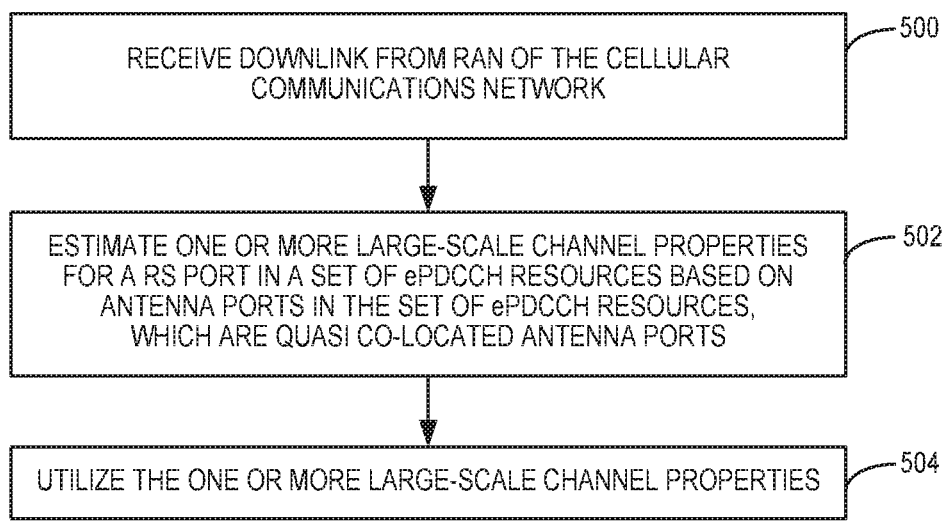
FIG. 21 illustrates the operation of the wireless device of FIG. 11 to perform channel estimation for an RS port within an ePDCCH region based on RSs that correspond to quasi co-located antenna ports according to another embodiment of the present disclosure in which antenna ports within the same set of ePDCCH resources are predefined as being quasi co-located.

FIG. 21 illustrates the operation of the WD 16 to estimate one or more large-scale channel properties for an RS port of interest (or correspondingly an antenna port of interest) within a set of ePDCCH resources within a subframe using RSs that correspond to quasi co-located antenna ports according to one embodiment of the present disclosure. In this embodiment, the ePDCCH resource regions in the subframe are divided into two or more sets of ePDCCH resources. For example, each ePDCCH resource region may correspond to a different set of ePDCCH resources. However, the sets of ePDCCH resources are not limited thereto. For instance, a set of ePDCCH resources may include ePDCCH resources from multiple different ePDCCH resource regions within the subframe. Conversely, a set of ePDCCH resources may include only a subset of the resources in an ePDCCH resource region.

In this embodiment, the WD 16 does not assume that the antenna ports corresponding to DMRS ports are quasi co-located with respect to any of the large-scale channel properties between DMRS ports and between PRBs that belong to different sets of ePDCCH resources. However, the WD 16 does assume that DMRS ports, and potentially all or some other types of RS ports, within the same set of ePDCCH resources are quasi co-located with respect to one or more of the large-scale channel properties.

As illustrated, the WD 16 receives a downlink signal from the RAN 12 (step 500). The WD 16 then estimates one or more large-scale channel properties for an RS port in a set of ePDCCH resources within a subframe of the downlink signal based on the RSs that correspond to antenna ports in the set of ePDCCH resources (step 502). The RSs within the set of ePDCCH resources, or more specifically the reference symbols in the RS ports within the set of ePDCCH resources, correspond to antenna ports that are quasi co-located with respect to the one or more large-scale channel properties according to the assumption noted above. For instance, the WD 16 may estimate the one or more large-scale channel properties for a DMRS port of interest based on the CSI-RS port(s) within the same set of ePDCCH resources. Lastly, the WD 16 utilizes the one or more large-scale channel properties of the RS port as discussed above (step 504).

Figure 22:
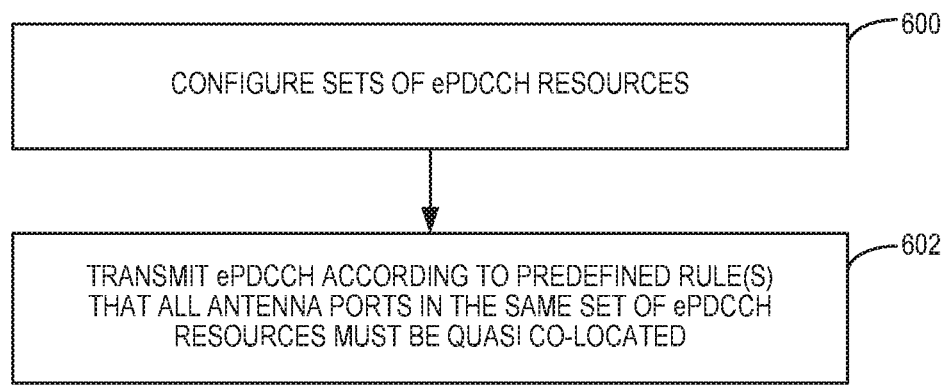
FIG. 22 illustrates the operation of the base station of the cellular communications network of FIG. 11 to transmit ePDCCH according to one or more predefined rules indicating that all antenna ports in a set of ePDCCH resources must be quasi co-located according to one embodiment of the present disclosure.

FIG. 22 illustrates the operation of one of the base stations 14 in the RAN 12 to provide the downlink in accordance with the embodiment of FIG. 21 according to one embodiment of the present disclosure. As illustrated, the base station 14 configures sets of ePDCCH resources (step 600). More specifically, the base station 14 configures the WD 16 to monitor one or more of the sets of ePDCCH resources (i.e., configures a search space of the WD 16 for ePDCCH). The base station 14 then transmits ePDCCH in accordance with the predefined rule(s) that all antenna ports in the same set of ePDCCH resources must be quasi co-located (step 602). Notably, at the WD 16, antenna ports in different sets of ePDCCH resources within a subframe are assumed to not be quasi co-located.

FIG. 23 illustrates the operation of the cellular communications network 10 according to another embodiment of the present disclosure. This embodiment is similar that that described above with respect to FIGS. 21 and 22. However, in this embodiment, the RAN 12 provides information to the WD 16 that indicates whether all RS ports or some defined subset of RS ports within the same set of ePDCCH resources correspond to quasi co-located antenna ports and, in some embodiments, information that is indicative of whether RS ports in two or more different sets of ePDCCH resources correspond to quasi co-located antenna ports. More specifically, as illustrated in FIG. 23, the RAN 12 configures a search space of the WD 16 for ePDCCH (step 700). In particular, the RAN 12 configures the search space to include one or more sets of ePDCCH resources. The configuration of the search space may be performed, for example, via RRC signaling.

In addition, the RAN 12 provides information to the WD 16, which is referred to as quasi co-located antenna information, that is indicative of which RS ports the WD 16 can assume correspond to quasi co-located antenna ports (step 702). In one preferred embodiment, the information indicates whether the WD 16 can assume that all RS ports or some subset of the RS ports within the same set of ePDCCH resources correspond to quasi co-located antenna ports. In some embodiments, the information also indicates whether the WD 16 can assume that all RS ports or some subset of the RS ports within two or more different sets of ePDCCH resources correspond to quasi co-located antenna ports. So, for example, if there are two sets of ePDCCH resources, the information indicates: (1) whether the RS ports or some subset of the RS ports within the same set of ePDCCH resources correspond to quasi co-located antenna ports and, optionally, (2) whether the RS ports or some subset of the RS ports in the two different sets of ePDCCH resources correspond to quasi co-located antenna ports. The information provided in step 702 may be provided by, for example, RRC signaling. Note that while steps 700 and 702 are illustrated as separate steps, steps 700 and 702 may be performed using a single message.

Sometime thereafter, the RAN 12 transmits a downlink subframe that includes ePDCCH (step 704). The WD 16 estimates one or more large-scale channel properties for an RS port within a set of ePDCCH resources based on RSs, or more specifically reference symbols in RS ports, that correspond to quasi co-located antenna ports as indicated in the information received from the RAN 12 in step 702 (step 706). The WD 16 then utilizes the one or more large-scale channel estimates as discussed above (step 708).

FIG. 24 illustrates the operation of the cellular communications network 10 according to one embodiment in which the WD 16 receives ePDCCH from two different base stations 14 (i.e., two different transmission points). As illustrated, in this embodiment, one of the base stations 14 (base station 14 corresponding to transmit point 1) transmits configuration information to the WD 16 that configures ePDCCH resources, namely, a first set of ePDCCH resources for transmit point 1 and a second set of ePDCCH resources for transmit point 2 (steps 800 and 802). In addition to configuring the ePDCCH resource sets, the base station 14 transmits quasi co-located antenna information to the WD 16 (step 804). In this embodiment, the quasi co-located antenna information indicates that the WD 16 can assume that antenna ports, or the corresponding RS ports, in the same ePDCCH resource set are quasi co-located. Notably, while steps 800-804 are illustrated as separate steps, the corresponding information may be transmitted in a single message.

Sometime thereafter, the base station 14 corresponding to transmit point 1 transmits a downlink subframe including ePDCCH transmission(s) in the first set of ePDCCH resources to the WD 16 (step 806). In the same downlink subframe, the base station 14 corresponding to transmit point 2 transmits ePDCCH transmission(s) in the second set of ePDCCH resources (step 808). The WD 16 estimates one or more large-scale channel properties for an RS port within the first set and/or the second set of ePDCCH resources based on RSs, or more specifically reference symbols in RS ports, in the same set of ePDCCH resources (step 810). Thus, the WD 16 estimates the one or more large-scale channel properties for an RS port in the first set of ePDCCH resources based on all of the other RS ports in the first set of ePDCCH resources, which for this embodiment can be assumed by the WD 16 to correspond to quasi co-located antenna ports. Likewise, the WD 16 estimates the one or more large-scale channel properties for an RS port in the second set of ePDCCH resources based on all of the other RS ports in the second set of ePDCCH resources, which for this embodiment can be assumed by the WD 16 to correspond to quasi co-located antenna ports. The WD 16 then utilizes the one or more large-scale channel estimates as discussed above (step 812).

FIG. 25 is a block diagram of one of the WDs 16 according to one embodiment of the present disclosure. As illustrated, the WD 16 includes a radio subsystem 18 and a processing subsystem 20. The radio subsystem 18 generally includes analog and, in some embodiments, digital components for sending and receiving data to and from the base stations 14. In particular embodiments, the radio subsystem 18 may represent or include one or more Radio Frequency (RF) transceivers, or separate RF transmitter(s) and receiver(s), capable of transmitting suitable information wirelessly to and receiving suitable information from other network components or nodes. From a wireless communications protocol view, the radio subsystem 18 implements at least part of Layer 1 (i.e., the Physical or "PHY" Layer).

The processing subsystem 20 generally implements any remaining portion of Layer 1 as well as functions for higher layers in the wireless communications protocol (e.g., Layer 2 (data link layer), Layer 3 (network layer), etc.). In particular embodiments, the processing subsystem 20 may comprise, for example, one or several general-purpose or special-purpose microprocessors or other microcontrollers programmed with suitable software and/or firmware to carry out some or all of the functionality of the WD 16 described herein. In addition or alternatively, the processing subsystem 20 may comprise various digital hardware blocks (e.g., one or more Application Specific Integrated Circuits (ASICs), one or more off-the-shelf digital and analog hardware components, or a combination thereof) configured to carry out some or all of the functionality of the WD 16 described herein. Additionally, in particular embodiments, the above described functionality of the WD 16 may be implemented, in whole or in part, by the processing subsystem 20 executing software or other instructions stored on a non-transitory computer-readable medium, such as Random Access Memory (RAM), Read Only Memory (ROM), a magnetic storage device, an optical storage device, or any other suitable type of data storage components. Of course, the detailed operation for each of the functional protocol layers, and thus the radio subsystem 18 and the processing subsystem 20, will vary depending on both the particular implementation as well as the standard or standards supported by the WD 16.

FIG. 26 is a block diagram of one of the base stations 14 according to one embodiment of the present disclosure. As illustrated, the base station 14 includes a radio subsystem 22 and a processing subsystem 24. The radio subsystem 22 generally includes analog and, in some embodiments, digital components for sending and receiving data to and from wireless devices, such as the WD 16, within a corresponding cell of the cellular communications network 10. In particular embodiments, the radio subsystem 22 may represent or include one or more RF transceiver(s), or separate RF transmitter(s) and receiver(s), capable of transmitting suitable information wirelessly to and receiving suitable information from other network components or nodes. From a wireless communications protocol view, the radio subsystem 22 implements at least part of Layer 1 (i.e., the Physical or "PHY" Layer).

The processing subsystem 24 generally implements any remaining portion of Layer 1 not implemented in the radio subsystem 22 as well as functions for higher layers in the wireless communications protocol (e.g., Layer 2 (data link layer), Layer 3 (network layer), etc.). In particular embodiments, the processing subsystem 24 may comprise, for example, one or several general-purpose or special-purpose microprocessors or other microcontrollers programmed with suitable software and/or firmware to carry out some or all of the functionality of the base station 14 described herein. In addition or alternatively, the processing subsystem 24 may comprise various digital hardware blocks (e.g., one or more ASICs, one or more off-the-shelf digital and analog hardware components, or a combination thereof) configured to carry out some or all of the functionality of the base station 14 described herein. Additionally, in particular embodiments, the above described functionality of the base station 14 may be implemented, in whole or in part, by the processing subsystem 24 executing software or other instructions stored on a non-transitory computer-readable medium, such as RAM, ROM, a magnetic storage device, an optical storage device, or any other suitable type of data storage components.

The following acronyms are used throughout this disclosure.

3GPP 3$^{rd}$ Generation Partnership Project
AL Aggregation Level
ASIC Application Specific Integrated Circuit
BS Base Station
CCE Control Channel Element
CoMP Coordinated Multi-Point
CRS Common Reference Signal
CSI-RS Channel State Information Reference Signal
CSS Common Search Space
DCI Downlink Control Information
DFT Discrete Fourier Transform
DL Downlink
DMRS Demodulation Reference Signal
DPS Dynamic Point Selection
eNB Enhanced Node B
ePDCCH Enhanced Physical Downlink Control Channel
ePHICH Enhanced Physical Hybrid Automatic Repeat Request Indicator Channel
GSM Global System for Mobile Communications
HARQ Hybrid Automatic Repeat Request
JT Joint Transmission
KHz Kilohertz
LTE Long Term Evolution
ms Millisecond
OFDM Orthogonal Frequency Division Multiplexing
PCFICH Physical Control Format Indicator Channel
PDCCH Physical Downlink Control Channel
PDSCH Physical Downlink Shared Channel
PRB Physical Resource Block
PSS Primary Synchronization Signal
PUSCH Physical Uplink Shared Channel
RAM Random Access Memory
RAN Radio Access Network
RB Resource Block
RE Resource Element
REG Resource Element Group
Rel-10 Long Term Evolution Release 10
Rel-11 Long Term Evolution Release 11
RF Radio Frequency
ROM Read Only Memory
RRC Radio Resource Control
RS Reference Signal
SSS Secondary Synchronization Signal
UE User Element
UL Uplink
UMB Ultra Mobile Broadband
WCDMA Wideband Code Division Multiple Access
WD Wireless Device
WiMAX Worldwide Interoperability for Microwave Access Those skilled in the art will recognize improvements and modifications to the preferred embodiments of the present disclosure. All such improvements and modifications are considered within the scope of the concepts disclosed herein and the claims that follow.

What is claimed is:

1. A wireless device configured to operate in a cellular communications network, comprising:
   a radio subsystem; and
   a processing subsystem associated with the radio subsystem configured to:
      receive, via the radio subsystem, a downlink subframe comprising a downlink control channel from the cellular communications network, a search space of the wireless device with respect to the downlink control channel comprising one or more sets of downlink control channel physical resources; and
      estimate a channel for an antenna port of interest in one of the one or more sets based on an assumption by the wireless device that one or more other antenna ports in the same one of the one or more sets are quasi co-located with respect to the antenna port of interest.

2. The wireless device of claim 1 wherein the processing subsystem is further configured to assume that the antenna port of interest is quasi co-located with the one or more other antenna ports in the set in accordance with one or more predefined rules that define which of the antenna ports must be quasi co-located for the downlink control channel.

3. The wireless device of claim 2 wherein antenna ports in a different one of the one or more sets are not assumed to be quasi co-located with respect to the antenna port of interest in accordance with the one or more predefined rules.

4. The wireless device of claim 1 wherein one or more physical resource blocks over which the one or more other antenna ports are quasi co-located with the antenna port of interest are predefined by the cellular communications network.

5. The wireless device of claim 1 wherein the one or more other antenna ports in the same set as the antenna port of interest are comprised in a first group of antenna ports, and wherein the processing subsystem is further configured to assume that the antenna port of interest is quasi co-located with one or more antenna ports comprised in a second group of antenna ports in the set in accordance with signaling received from the cellular communications network.

6. The wireless device of claim 1 wherein:
   antenna ports in the same set are quasi co-located with respect to one or more of a group of large-scale channel properties consisting of: delay spread, Doppler spread, Doppler shift, average gain, and average delay; and
   estimating the channel for the antenna port of interest in one of the one or more sets based on the assumption by the wireless device comprises estimating one or more of the group of large-scale channel properties for the antenna port of interest.

7. The wireless device of claim 1 wherein the cellular communications network is a Long Term Evolution, cellular communications network, the downlink control channel is an enhanced Physical Downlink Control Channel, the one or more sets of downlink control channel physical resources are one or more sets of enhanced Physical Downlink Control Channel physical resource block pairs, where each set of enhanced Physical Downlink Control Channel physical resource block pairs includes one or more physical resource block pairs in one or more enhanced Physical Downlink Control Channel regions within the downlink subframe.

8. The wireless device of claim 1 wherein the antenna port of interest is a Demodulation Reference Signal, DMRS, port.

9. The wireless device of claim 8, wherein the one or more other antenna ports in the same set comprise at least one of a group consisting of: at least one other DMRS port in the same set and at least one Reference Signal, RS, port of a type other than DMRS.

10. The wireless device of claim 1, wherein each of the one or more sets of downlink control channel physical resources is associated with a different transmission point in the cellular communications network than another one of the one or more sets of downlink control channel physical resources.

11. A method of operation of a wireless device in a cellular communications network, comprising:
   receiving a downlink subframe from the cellular communications network, the downlink subframe comprising a downlink control channel from the cellular communications network, a search space of the wireless device with respect to the downlink control channel comprising one or more sets of downlink control channel physical resources; and
   estimating a channel for an antenna port of interest in one of the one or more sets based on an assumption by the wireless device that one or more other antenna ports in the same one of the one or more sets are quasi co-located with respect to the antenna port of interest.

12. The method of claim 11 wherein estimating the channel includes:
   assuming that the antenna port of interest is quasi co-located with the one or more other antenna ports in the set in accordance with one or more predefined rules that define which of the antenna ports must be quasi co-located for the downlink control channel.

13. The method of claim 12 wherein antenna ports in a different one of the one or more sets are not assumed to be quasi co-located with respect to the antenna port of interest in accordance with the one or more predefined rules.

14. The method of claim 11 wherein one or more physical resource blocks over which the one or more other antenna ports are quasi co-located with the antenna port of interest are predefined by the cellular communications network.

15. The method of claim 11 wherein the one or more other antenna ports in the same set as the antenna port of interest are comprised in a first group of antenna ports, wherein estimating the channel includes:
   assuming that the antenna port of interest is quasi co-located with one or more antenna ports comprised in a second group of antenna ports in the set in accordance with signaling received from the cellular communications network.

16. The method of claim 11 wherein:
   antenna ports in the same set are quasi co-located with respect to one or more of a group of large-scale channel properties consisting of: delay spread, Doppler spread, Doppler shift, average gain, and average delay; and
   estimating the channel for the antenna port of interest in one of the one or more sets based on the assumption by the wireless device comprises estimating one or more of the group of large-scale channel properties for the antenna port of interest.

17. The method of claim 11 wherein the cellular communications network is a Long Term Evolution, cellular communications network, the downlink control channel is an enhanced Physical Downlink Control Channel, the one or more sets of downlink control channel physical resources are one or more sets of enhanced Physical Downlink Control Channel physical resource block pairs, where each set of enhanced Physical Downlink Control Channel physical resource block pairs includes one or more physical resource block pairs in one or more enhanced Physical Downlink Control Channel regions within the downlink subframe.

18. The method of claim 11 wherein the antenna port of interest is a Demodulation Reference Signal, DMRS, port.

19. The method of claim 18, wherein the one or more other antenna ports in the same set comprise at least one of a group consisting of: at least one other DMRS port in the same set and at least one Reference Signal, RS, port of a type other than DMRS.

20. The method of claim 11, wherein each of the one or more sets of downlink control channel physical resources is associated with a different transmission point in the cellular communications network than another one of the one or more sets of downlink control channel physical resources.

\* \* \* \* \*